US012486334B2

(12) United States Patent
Craik et al.

(10) Patent No.: US 12,486,334 B2
(45) Date of Patent: Dec. 2, 2025

(54) CHEMICALLY CONTROLLED MONOCLONAL ANTIBODY TARGET ENGAGEMENT

(71) Applicant: The Regents of the University of California, Oakland, CA (US)

(72) Inventors: Charles S. Craik, San Francisco, CA (US); Kevan M. Shokat, San Francisco, CA (US); Ziyang Zhang, San Francisco, CA (US); Peter J. Rohweder, San Francisco, CA (US)

(73) Assignee: The Regents of the University of California, Oakland, CA (US)

( * ) Notice: Subject to any disclaimer, the term of this patent is extended or adjusted under 35 U.S.C. 154(b) by 997 days.

(21) Appl. No.: 17/626,459

(22) PCT Filed: Jul. 10, 2020

(86) PCT No.: PCT/US2020/041710
§ 371 (c)(1),
(2) Date: Jan. 11, 2022

(87) PCT Pub. No.: WO2021/011417
PCT Pub. Date: Jan. 21, 2021

(65) Prior Publication Data
US 2022/0289866 A1    Sep. 15, 2022

Related U.S. Application Data

(60) Provisional application No. 62/873,505, filed on Jul. 12, 2019.

(51) Int. Cl.
| | |
|---|---|
| *C07K 16/44* | (2006.01) |
| *A61K 39/00* | (2006.01) |
| *A61K 39/395* | (2006.01) |
| *A61K 47/50* | (2017.01) |
| *A61K 47/68* | (2017.01) |
| *A61P 35/00* | (2006.01) |
| *C07K 16/28* | (2006.01) |
| *G01N 33/574* | (2006.01) |

(52) U.S. Cl.
CPC ........ *C07K 16/44* (2013.01); *A61K 39/39558* (2013.01); *A61K 39/39583* (2013.01); *A61K 47/50* (2017.08); *A61K 47/6843* (2017.08); *A61P 35/00* (2018.01); *C07K 16/2809* (2013.01); *G01N 33/574* (2013.01); *A61K 2039/505* (2013.01); *C07K 2317/21* (2013.01); *C07K 2317/24* (2013.01); *C07K 2317/31* (2013.01); *C07K 2317/55* (2013.01); *C07K 2317/565* (2013.01); *C07K 2317/92* (2013.01)

(58) Field of Classification Search
None
See application file for complete search history.

(56) References Cited

U.S. PATENT DOCUMENTS

| | | | |
|---|---|---|---|
| 11,207,394 B2 | 12/2021 | Wang et al. | |
| 2018/0153975 A1 | 6/2018 | Fritsch et al. | |
| 2019/0307868 A1* | 10/2019 | Rooney | A61K 40/19 |

FOREIGN PATENT DOCUMENTS

| | | |
|---|---|---|
| WO | WO-2016172722 A1 | 10/2016 |
| WO | WO-2017173321 A1 | 10/2017 |
| WO | WO-2018144955 A1 | 8/2018 |

OTHER PUBLICATIONS

Awad et al., (2021). "Acquired Resistance to KRASG12C Inhibition in Cancer," N Engl J Med, 384:2382-2393.
Canon et al., (2019). "The clinical KRAS(G12C) inhibitor AMG 510 drives anti-tumour immunity," Nature, 575:217-223, 21 pages.
Chandran et al., (2022). "Immunogenicity and therapeutic targeting of a public neoantigen derived from mutated PIK3CA," Nat Med, 28:946-957, 28 pages.
Engelhard et al., (2006). "Post-translational modifications of naturally processed MHC-binding epitopes," Current Opinion in Immunology, 18:92-97.
Fakih et al., (2019). "Abstract 3003: Phase 1 study evaluating the safety, tolerability, pharmacokinetics (PK), and efficacy of AMG 510, a novel small molecule KRASG12C inhibitor, in advanced solid tumors," J Clin Oncol, 37:3003, 2 pages.
FDA, (2021). "Highlights of Prescribing Information: Lumakras™ (sotorasib) tablets," available online at <https://www.accessdata.fda.gov/drugsatfda_docs/label/2025/214665s009lbl.pdf>, 15 pages.
Hattori et al., (2023). "Creating MHC-Restricted Neoantigens with Covalent Inhibitors That Can Be Targeted by Immune Therapy," Cancer Discovery, 13:132-145.
Koga et al., (2021). "KRAS Secondary Mutations That Confer Acquired Resistance to Kras G12C Inhibitors, Sotorasib and Adagrasib, and Overcoming Strategies: Insights From In Vitro Experiments," J Thorac Oncol, 16(8):1321-1332.
Mallevaey et al., (2011). "A Molecular Basis for NKT Cell Recognition of CD1d-Self-Antigen," Immunity, 34:315-326.
Pellicci et al., (2011). "Recognition of β-linked self glycolipids mediated by natural killer T cell antigen receptors," Nat Immunol, 12:827-833, 17 pages.
Pramanick et al., (2013). "Excipient Selection in Parenteral Formulation Development," Pharma Times, 45:65-77.
Ramarathinam et al., (2018). "Employing proteomics in the study of antigen presentation: an update," Expert Review of Proteomics, 15:637-645, 19 pages.

(Continued)

*Primary Examiner* — Zachariah Lucas
*Assistant Examiner* — Sarah A Alsomairy
(74) *Attorney, Agent, or Firm* — Morrison & Foerster LLP

(57) ABSTRACT

The present disclosure relates generally to antibodies reactive with tumor-specific neoantigens, as well as neoantigen-binding fragments thereof. The present disclosure also relates to nucleic acids, expression cassettes, and expression vectors encoding the antibodies and neoantigen-binding fragments. The antibodies and neoantigen binding-fragments are useful for diagnosis and treatment of cancer.

13 Claims, 12 Drawing Sheets

Specification includes a Sequence Listing.

(56) References Cited

OTHER PUBLICATIONS

Reynisson et al., (2020). "NetMHCpan-4.1 and NetMHCIIpan-4.0: improved predictions of MHC antigen presentation by concurrent motif deconvolution and integration of MS MHC eluted ligand data," Nucleic Acids Research, 48:W449-W454.

Rohweder, (Mar. 6, 2023). "Tumor-specific therapies targeting antigen presentation and misregulated proteolysis," Doctoral Dissertation submitted Aug. 15, 2022, University of California, San Francisco, 133 pages+1 page re Embargo.

Rullo et al., (2016). "Re-engineering the Immune Responpse to Metastatic Cancer: Antibody-Recruiting Small Molecules Targeting the Urokinase Receptor," Angewandte Chemie International Edition, 55:3642-3646.

Szeto et al., (2020). "TCR Recognition of Peptide-MHC-I: Rule Makers and Breakers," Int J Mol Sci, 22:68, 26 pages.

Tanaka et al., (2021). "Clinical Acquired Resistance to KRASG12C Inhibition through a Novel KRAS Switch-II Pocket Mutation and Polyclonal Alterations Converging on RAS-MAPK Reactivation," Cancer Discov, 11(8):1913-1922.

Wang et al., (2019). "Direct detection and quantification of neoantigens," Cancer Immunology Research, 7(11):1748-1754.

Chang et al., (2016). "Opportunities and challenges for TCR mimic antibodies in cancer therapy," Expert Opin Biol Ther, 16:979-987, 18 pages.

Dao et al., (2013). "Targeting the Intracellular WTI Oncogene Product with a Therapeutic Human Antibody," Science Translational Medicine, 5(176):90-100, 26 pages.

Dao et al., (2015). "Therapeutic bispecific T-cell engager antibody targeting the intracellular oncoprotein WT1," Nature Biotechnology, 33:1079-1086, 21 pages.

Duriseti et al., (2010). "Antagonistic anti-urokinase plasminogen activator receptor (uPAR) antibodies significantly inhibit uPAR-mediated cellular signaling and migration," J Biol Chem, 285:26878-26888.

Erkes et al., (2014). "Hapten-induced contact hypersensitivity, autoimmune reactions, and tumor regression: plausibility of mediating antitumor immunity," J Immunol Res, 2014:175265, 28 pages.

Extended European Search Report and Written Opinion received for European Patent Application No. 20840331.1 mailed on Jul. 4, 2023, 11 pages.

Hansen et al., (2018). "An internally controlled quantitative target occupancy assay for covalent inhibitors," Scientific Reports, 8:14312, 7 pages.

International Search Report and Written Opinion received for International Patent Application No. PCT/US2020/041710 mailed on Oct. 26, 2020, 13 pages.

Janes et al., (2018). "Targeting KRAS Mutant Cancers with a Covalent G12C-Specific Inhibitor," Cell, 172:578-589.

Martin et al., (1994). "T Cell Recognition of Haptens, a Molecular View," Int Arch Allergy Immunol, 104:10-16.

Padovan et al., (1997). "Penicilloyl peptides are recognized as T cell antigenic determinants in penicillin allergy," Eur J Immunol, 27:1303-1307.

Rock et al., (2016). "Present Yourself! By MHC Class I and MHC Class II Molecules," Trends in Immunology, 37(11):724-737, 24 pages.

Sharma et al., (2016). "Recent advances in T-cell engineering for use in immunotherapy," F1000 Research, 5(F1000 Faculty Rev):2344, 12 pages.

Skora et al., (2015). "Generation of MANAbodies specific to HLA-restricted epitopes encoded by somatically mutated genes," Proc. Natl. Acad. Sci. USA, 112(32):9967-9972.

Tran et al., (2016). "T-Cell Transfer Therapy Targeting Mutant KRAS in Cancer," New England Journal of Medicine, 375:2255-2262.

Visscher et al., (2016). "Covalent targeting of acquired cysteines in cancer," Current Opinion in Chemical Biology, 30:61-67.

Zhang et al., (2022). "A covalent inhibitor of K-Ras(G12C) induces MHC class I presentation of haptenated peptide neoepitopes targetable by immunotherapy," Cancer Cell, 40(9):1060-1069, 18 pages.

\* cited by examiner

Fab Light Chain Sequences

```
P2F11  LFAIPLVVPFYSHSAQSVLTQPPSASGTPGQRVTISCSGGNSNIKSNTVSWYRQLPGATP  60
P2F10  LFAIPLVVPFYSHSAQSVLTQPPSVSAAPGQKVTISCSGSASNIGSNHVSWYQHVPGTAP  60
P1A4   LFAIPLVVPFYSHSAQSVVTQPPSVSAAPGQEVTISCSGSSSNIGNNYVSWYQHLPGTAP  60
P1C1   LFAIPLVVPFYSHSAQSVVTQPPSVSAAPGQKVTVSCSGSNSNIGDNYVSWYQLLPGTAP  60
P1H6   LFAIPLVVPFYSHSAQSVLTQPPSVSAAPGQKVTVSCSGSSSNIGNNYVSWYQLLPGTAP  60
       *************:***************.*:.***.**:.***  *. *  **.::.*

P2F11  KLLIYKTSQRPSGVPDRFSGSKSDTSATLDIAGLQTGDEADYYCGTWDNSLSSVVFGGGT  120
P2F10  QLLIYDDKQRPSGIPDRFSGSKSGTSAALAITGLQTGDEADYYCATWDNSLASAFFGGGT  120
P1A4   KLLIYDSDKRPSGIPDRFSGSKSGTSATLGVTGLQTGDEADYYCGTWDSSLSAVMFGGGT  120
P1C1   KLLIYDNNKRPSGILDRFSGSKSGTSATLDITGLQTGDEADYYCGTWDSSLLTVVFGGGT  120
P1H6   KLLIYDNNKRPSGILDRFSGSKSGTSATLDITGLQTGDEADYYCGTWDSSLINVVFGGGT  120
       :****  *:****: ********.*** * : *:.:*************  .  *****

P2F11  RVTVLGQPKAAPSVTLFPPSSEELQANKATLVCLISDFYPGAVTVAWKADGSPVKAGVET  180
P2F10  KLTVLSQPKAAPSVTLFPPSSEELQANKATLVCLISDFYPGAVTVAWKADGSPVKAGVET  180
P1A4   KLTVLGQPKAAPSVTLFPPSSEELQANKATLVCLISDFYPGAVTVAWKADSSPVKAGVET  180
P1C1   KLTVLGQPKAAPSVTLFPPSSEELQANKATLVCLISDFYPGAVTVAWKADSSPVKAGVET  180
P1H6   KVTVLSQPKAAPSVTLFPPSSEELQANKATLVCLISDFYPGAVTVAWKADSSPVKAGVET  180
       :.*** ********************************************.********

P2F11  TTPSKQSNNKYAASSYLSLTPEQWKSHRSYSCQVTHEGSTVEKTVAPTECS  231
P2F10  TKPSKQSNNKYAASSYLSLTPEQWKSHKSYSCQVTHEGSTVEKTVAPTECS  231
P1A4   TTPSKQSNNKYAASSYLSLTPEQWKSHKSYSCQVTHEGSTVEKTVAPTECS  231
P1C1   TTPSKQSNNKYAASSYLSLTPEQWKSHKSYSCQVTHEGSTVEKTVAPTECS  231
P1H6   TTPSKQSNNKYAASSYLSLTPEQWKSHRSYSCQVTHEGSTVEKTVAPTECS  231
       *.*************************:**********************
```

FIG. 2A

Fab Heavy Chain Sequences

```
P1A4    QVQLQESGGGLVQPGRSLRLSCAASGFTFSSYAMHWVRQAPGKGLEWVAVISYDGSNKYY  60
P2F10   EVQLVESGGGVVQPGRSLRLSCAASGFTFSNYAMHWVRQAPGKGLEWVALISYDGSITYY  60
P2F11   DVQLVESGGGVVQPGRSLRLSCAASGFTFSNYAMHWVRQAPGKGLEWVALISYDGSNKFH  60
P1C1    QVQLLESGGGVVQPGRSLRLSCAASGFTFSSYAMHWVRQAPGKGLEWLASISYDGSNKFH  60
P1H6    QVQLVESGGGVVQPGRSLRLSCAASGFTFSSYAMHWVRQAPGKGLEWLASISYDGSNKFH  60
        :*** ******* ***************** *************** *.:******

P1A4    ADSVKGRFTISRDNSKNTLYLQMNSLRAEDTAVYYCARD---YDWQYFDYWGQGTLVTVS  117
P2F10   ADSVKGRFTISRDNSKDTLYLQMNSLRPEDTTLYYCARERVPYDYYGMAVWGQGTTVTVS  120
P2F11   ADSVKGRFTISRDNSKSTLYLQMNSLRAEDTAVYYCVRERVPWDYDGMDVWGQGTTVTVS  120
P1C1    ADSVKGRFTISRDNSKSTLYLQMNSLRAEDTAVYYCVRERVPWDYDGMDVWGQGTTVTVS  120
P1H6    ADSVKGRFTISRDNSKSTLYLQMNSLRAEDTAVYYCVRERVPWDYDGMDVWGQGTTVTVS  120
        **************..*********** ** :****:.**:    . ***** ******

P1A4    SASTKGPSVFPLAPSSKSTSGGTAALGCLVKDYFPEPVTVSWNSGALTSGVHTFPAVLQS  177
P2F10   SASTKGPSVFPLAPSSKSTSGGTAALGCLVKDYFPEPVTVSWNSGALTSGVHTFPAVLQS  180
P2F11   SASTKGPSVFPLAPSSKSTSGGTAALGCLVKDYFPEPVTVSWNSGALTSGVHTFPAVLQS  180
P1C1    SASTKGPSVFPLAPSSKSTSGGTAALGCLVKDYFPEPVTVSWNSGALTSGVHTFPAVLQS  180
P1H6    SASTKGPSVFPLAPSSKSTSGGTAALGCLVKDYFPEPVTVSWNSGALTSGVHTFPAVLQS  180
        ************************************************************

P1A4    SGLYSLSSVVTVPSSSLGTQTYICNVNHKPSNTKVDKKVEPKSCAAA  224
P2F10   SGLYSLSSVVTVPSSSLGTQTYICNVNHKPSNTKVDKKVEPKSCAAA  227
P2F11   SGLYSLSSVVTVPSSSLGTQTYICNVNHKPSNTKVDKKVEPKSCAAA  227
P1C1    SGLYSLSSVVTVPSSSLGTQTYICNVNHKPSNTKVDKKVEPKSCAAA  227
P1H6    SGLYSLSSVVTVPSSSLGTQTYICNVNHKPSNTKVDKKVEPKSCAAA  227
        ***********************************************
```

FIG. 2B

SEQUENCE LISTING

```
<160> NUMBER OF SEQ ID NOS: 66

<210> SEQ ID NO 1
<211> LENGTH: 10
<212> TYPE: PRT
<213> ORGANISM: Artificial Sequence
<220> FEATURE:
<223> OTHER INFORMATION: Synthetic Construct

<400> SEQUENCE: 1

Gly Ala Cys Gly Val Gly Lys Ser Ala Leu
1               5                   10

<210> SEQ ID NO 2
<211> LENGTH: 10
<212> TYPE: PRT
<213> ORGANISM: Artificial Sequence
<220> FEATURE:
<223> OTHER INFORMATION: Synthetic Construct
<220> FEATURE:
<221> NAME/KEY: VARIANT
<222> LOCATION: 3
<223> OTHER INFORMATION: ARS-1620(S-atropisomer)-modified cysteine

<400> SEQUENCE: 2

Gly Ala Cys Gly Val Gly Lys Ser Ala Leu
1               5                   10

<210> SEQ ID NO 3
<211> LENGTH: 10
<212> TYPE: PRT
<213> ORGANISM: Artificial Sequence
<220> FEATURE:
<223> OTHER INFORMATION: Synthetic Construct
<220> FEATURE:
<221> NAME/KEY: VARIANT
<222> LOCATION: 3
<223> OTHER INFORMATION: ARS-1620(R-atropisomer)-modified cysteine

<400> SEQUENCE: 3

Gly Ala Cys Gly Val Gly Lys Ser Ala Leu
1               5                   10

<210> SEQ ID NO 4
<211> LENGTH: 10
<212> TYPE: PRT
<213> ORGANISM: Artificial Sequence
<220> FEATURE:
<223> OTHER INFORMATION: Synthetic Construct
<220> FEATURE:
<221> NAME/KEY: VARIANT
<222> LOCATION: 3
<223> OTHER INFORMATION: ARS-1620(S-atropisomer)-modified cysteine
<220> FEATURE:
<221> NAME/KEY: VARIANT
<222> LOCATION: 10
<223> OTHER INFORMATION: Norleucine

<400> SEQUENCE: 4

Gly Gly Cys Gly Gly Gly Gly Gly Gly Leu
1               5                   10

<210> SEQ ID NO 5
<211> LENGTH: 231
<212> TYPE: PRT
<213> ORGANISM: Artificial Sequence
<220> FEATURE:
<223> OTHER INFORMATION: Synthetic Construct

<400> SEQUENCE: 5
```

```
Leu Phe Ala Ile Pro Leu Val Val Pro Phe Tyr Ser His Ser Ala Gln
1               5                   10                  15

Ser Val Val Thr Gln Pro Pro Ser Val Ser Ala Ala Pro Gly Gln Glu
            20                  25                  30

Val Thr Ile Ser Cys Ser Gly Ser Ser Ser Asn Ile Gly Asn Asn Tyr
            35                  40                  45

Val Ser Trp Tyr Gln His Leu Pro Gly Thr Ala Pro Lys Leu Leu Ile
        50                  55                  60

Tyr Asp Ser Asp Lys Arg Pro Ser Gly Ile Pro Asp Arg Phe Ser Gly
65                  70                  75                  80

Ser Lys Ser Gly Thr Ser Ala Thr Leu Gly Val Thr Gly Leu Gln Thr
                85                  90                  95

Gly Asp Glu Ala Asp Tyr Tyr Cys Gly Thr Trp Asp Ser Ser Leu Ser
                100                 105                 110

Ala Val Met Phe Gly Gly Gly Thr Lys Leu Thr Val Leu Gly Gln Pro
            115                 120                 125

Lys Ala Ala Pro Ser Val Thr Leu Phe Pro Pro Ser Ser Glu Glu Leu
            130                 135                 140

Gln Ala Asn Lys Ala Thr Leu Val Cys Leu Ile Ser Asp Phe Tyr Pro
145                 150                 155                 160

Gly Ala Val Thr Val Ala Trp Lys Ala Asp Ser Ser Pro Val Lys Ala
                165                 170                 175

Gly Val Glu Thr Thr Thr Pro Ser Lys Gln Ser Asn Asn Lys Tyr Ala
                180                 185                 190

Ala Ser Ser Tyr Leu Ser Leu Thr Pro Glu Gln Trp Lys Ser His Lys
            195                 200                 205

Ser Tyr Ser Cys Gln Val Thr His Glu Gly Ser Thr Val Glu Lys Thr
            210                 215                 220

Val Ala Pro Thr Glu Cys Ser
225                 230

<210> SEQ ID NO 6
<211> LENGTH: 231
<212> TYPE: PRT
<213> ORGANISM: Artificial Sequence
<220> FEATURE:
<223> OTHER INFORMATION: Synthetic Construct

<400> SEQUENCE: 6

Leu Phe Ala Ile Pro Leu Val Val Pro Phe Tyr Ser His Ser Ala Gln
1               5                   10                  15

Ser Val Leu Thr Gln Pro Pro Ser Val Ser Ala Ala Pro Gly Gln Lys
            20                  25                  30

Val Thr Ile Ser Cys Ser Gly Ser Ala Ser Asn Ile Gly Ser Asn His
            35                  40                  45

Val Ser Trp Tyr Gln His Val Pro Gly Thr Ala Pro Gln Leu Leu Ile
        50                  55                  60

Tyr Asp Asp Lys Gln Arg Pro Ser Gly Ile Pro Asp Arg Phe Ser Gly
65                  70                  75                  80

Ser Lys Ser Gly Thr Ser Ala Ala Leu Ala Ile Thr Gly Leu Gln Thr
                85                  90                  95

Gly Asp Glu Ala Asp Tyr Tyr Cys Ala Thr Trp Asp Asn Ser Leu Ala
                100                 105                 110

Ser Ala Phe Phe Gly Gly Gly Thr Lys Leu Thr Val Leu Ser Gln Pro
            115                 120                 125
```

Lys Ala Ala Pro Ser Val Thr Leu Phe Pro Pro Ser Ser Glu Glu Leu
            130                 135                 140

Gln Ala Asn Lys Ala Thr Leu Val Cys Leu Ile Ser Asp Phe Tyr Pro
145                 150                 155                 160

Gly Ala Val Thr Val Ala Trp Lys Ala Asp Gly Ser Pro Val Lys Ala
                165                 170                 175

Gly Val Glu Thr Thr Lys Pro Ser Lys Gln Ser Asn Asn Lys Tyr Ala
            180                 185                 190

Ala Ser Ser Tyr Leu Ser Leu Thr Pro Glu Gln Trp Lys Ser His Lys
        195                 200                 205

Ser Tyr Ser Cys Gln Val Thr His Glu Gly Ser Thr Val Glu Lys Thr
    210                 215                 220

Val Ala Pro Thr Glu Cys Ser
225                 230

<210> SEQ ID NO 7
<211> LENGTH: 231
<212> TYPE: PRT
<213> ORGANISM: Artificial Sequence
<220> FEATURE:
<223> OTHER INFORMATION: Synthetic Construct

<400> SEQUENCE: 7

Leu Phe Ala Ile Pro Leu Val Val Pro Phe Tyr Ser His Ser Ala Gln
1               5                   10                  15

Ser Val Leu Thr Gln Pro Pro Ser Ala Ser Gly Thr Pro Gly Gln Arg
            20                  25                  30

Val Thr Ile Ser Cys Ser Gly Gly Asn Ser Asn Ile Lys Ser Asn Thr
        35                  40                  45

Val Ser Trp Tyr Arg Gln Leu Pro Gly Ala Thr Pro Lys Leu Leu Ile
    50                  55                  60

Tyr Lys Thr Ser Gln Arg Pro Ser Gly Val Pro Asp Arg Phe Ser Gly
65                  70                  75                  80

Ser Lys Ser Asp Thr Ser Ala Thr Leu Asp Ile Ala Gly Leu Gln Thr
                85                  90                  95

Gly Asp Glu Ala Asp Tyr Tyr Cys Gly Thr Trp Asp Asn Ser Leu Ser
            100                 105                 110

Ser Val Val Phe Gly Gly Gly Thr Arg Val Thr Val Leu Gly Gln Pro
        115                 120                 125

Lys Ala Ala Pro Ser Val Thr Leu Phe Pro Pro Ser Ser Glu Glu Leu
            130                 135                 140

Gln Ala Asn Lys Ala Thr Leu Val Cys Leu Ile Ser Asp Phe Tyr Pro
145                 150                 155                 160

Gly Ala Val Thr Val Ala Trp Lys Ala Asp Gly Ser Pro Val Lys Ala
                165                 170                 175

Gly Val Glu Thr Thr Thr Pro Ser Lys Gln Ser Asn Asn Lys Tyr Ala
            180                 185                 190

Ala Ser Ser Tyr Leu Ser Leu Thr Pro Glu Gln Trp Lys Ser His Arg
        195                 200                 205

Ser Tyr Ser Cys Gln Val Thr His Glu Gly Ser Thr Val Glu Lys Thr
    210                 215                 220

Val Ala Pro Thr Glu Cys Ser
225                 230

<210> SEQ ID NO 8

<211> LENGTH: 231
<212> TYPE: PRT
<213> ORGANISM: Artificial Sequence
<220> FEATURE:
<223> OTHER INFORMATION: Synthetic Construct

<400> SEQUENCE: 8

```
Leu Phe Ala Ile Pro Leu Val Val Pro Phe Tyr Ser His Ser Ala Gln
1               5                   10                  15

Ser Val Val Thr Gln Pro Pro Ser Val Ser Ala Ala Pro Gly Gln Lys
            20                  25                  30

Val Thr Val Ser Cys Ser Gly Ser Asn Ser Asn Ile Gly Asp Asn Tyr
        35                  40                  45

Val Ser Trp Tyr Gln Leu Leu Pro Gly Thr Ala Pro Lys Leu Leu Ile
    50                  55                  60

Tyr Asp Asn Asn Lys Arg Pro Ser Gly Ile Leu Asp Arg Phe Ser Gly
65                  70                  75                  80

Ser Lys Ser Gly Thr Ser Ala Thr Leu Asp Ile Thr Gly Leu Gln Thr
                85                  90                  95

Gly Asp Glu Ala Asp Tyr Tyr Cys Gly Thr Trp Asp Ser Ser Leu Leu
            100                 105                 110

Thr Val Val Phe Gly Gly Gly Thr Lys Leu Thr Val Leu Gly Gln Pro
        115                 120                 125

Lys Ala Ala Pro Ser Val Thr Leu Phe Pro Pro Ser Ser Glu Glu Leu
    130                 135                 140

Gln Ala Asn Lys Ala Thr Leu Val Cys Leu Ile Ser Asp Phe Tyr Pro
145                 150                 155                 160

Gly Ala Val Thr Val Ala Trp Lys Ala Asp Ser Ser Pro Val Lys Ala
                165                 170                 175

Gly Val Glu Thr Thr Thr Pro Ser Lys Gln Ser Asn Asn Lys Tyr Ala
            180                 185                 190

Ala Ser Ser Tyr Leu Ser Leu Thr Pro Glu Gln Trp Lys Ser His Lys
        195                 200                 205

Ser Tyr Ser Cys Gln Val Thr His Glu Gly Ser Thr Val Glu Lys Thr
    210                 215                 220

Val Ala Pro Thr Glu Cys Ser
225                 230
```

<210> SEQ ID NO 9
<211> LENGTH: 231
<212> TYPE: PRT
<213> ORGANISM: Artificial Sequence
<220> FEATURE:
<223> OTHER INFORMATION: Synthetic Construct

<400> SEQUENCE: 9

```
Leu Phe Ala Ile Pro Leu Val Val Pro Phe Tyr Ser His Ser Ala Gln
1               5                   10                  15

Ser Val Leu Thr Gln Pro Pro Ser Val Ser Ala Ala Pro Gly Gln Lys
            20                  25                  30

Val Thr Val Ser Cys Ser Gly Ser Ser Ser Asn Ile Gly Asn Asn Tyr
        35                  40                  45

Val Ser Trp Tyr Gln Leu Leu Pro Gly Thr Ala Pro Lys Leu Leu Ile
    50                  55                  60

Tyr Asp Asn Asn Lys Arg Pro Ser Gly Ile Leu Asp Arg Phe Ser Gly
65                  70                  75                  80

Ser Lys Ser Gly Thr Ser Ala Thr Leu Asp Ile Thr Gly Leu Gln Thr
```

```
                  85                  90                  95
Gly Asp Glu Ala Asp Tyr Tyr Cys Gly Thr Trp Asp Ser Ser Leu Ile
                100                 105                 110

Asn Val Val Phe Gly Gly Gly Thr Lys Val Thr Val Leu Ser Gln Pro
                115                 120                 125

Lys Ala Ala Pro Ser Val Thr Leu Phe Pro Pro Ser Ser Glu Glu Leu
        130                 135                 140

Gln Ala Asn Lys Ala Thr Leu Val Cys Leu Ile Ser Asp Phe Tyr Pro
145                 150                 155                 160

Gly Ala Val Thr Val Ala Trp Lys Ala Asp Ser Ser Pro Val Lys Ala
                165                 170                 175

Gly Val Glu Thr Thr Thr Pro Ser Lys Gln Ser Asn Asn Lys Tyr Ala
                180                 185                 190

Ala Ser Ser Tyr Leu Ser Leu Thr Pro Glu Gln Trp Lys Ser His Arg
                195                 200                 205

Ser Tyr Ser Cys Gln Val Thr His Glu Gly Ser Thr Val Glu Lys Thr
        210                 215                 220

Val Ala Pro Thr Glu Cys Ser
225                 230

<210> SEQ ID NO 10
<211> LENGTH: 224
<212> TYPE: PRT
<213> ORGANISM: Artificial Sequence
<220> FEATURE:
<223> OTHER INFORMATION: Synthetic Construct

<400> SEQUENCE: 10

Gln Val Gln Leu Gln Glu Ser Gly Gly Gly Leu Val Gln Pro Gly Arg
1               5                   10                  15

Ser Leu Arg Leu Ser Cys Ala Ala Ser Gly Phe Thr Phe Ser Ser Tyr
                20                  25                  30

Ala Met His Trp Val Arg Gln Ala Pro Gly Lys Gly Leu Glu Trp Val
            35                  40                  45

Ala Val Ile Ser Tyr Asp Gly Ser Asn Lys Tyr Tyr Ala Asp Ser Val
    50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Val Tyr Tyr Cys
                85                  90                  95

Ala Arg Asp Tyr Asp Trp Gln Tyr Phe Asp Tyr Trp Gly Gln Gly Thr
                100                 105                 110

Leu Val Thr Val Ser Ser Ala Ser Thr Lys Gly Pro Ser Val Phe Pro
            115                 120                 125

Leu Ala Pro Ser Ser Lys Ser Thr Ser Gly Gly Thr Ala Ala Leu Gly
        130                 135                 140

Cys Leu Val Lys Asp Tyr Phe Pro Glu Pro Val Thr Val Ser Trp Asn
145                 150                 155                 160

Ser Gly Ala Leu Thr Ser Gly Val His Thr Phe Pro Ala Val Leu Gln
                165                 170                 175

Ser Ser Gly Leu Tyr Ser Leu Ser Val Val Thr Val Pro Ser Ser
                180                 185                 190

Ser Leu Gly Thr Gln Thr Tyr Ile Cys Asn Val Asn His Lys Pro Ser
                195                 200                 205

Asn Thr Lys Val Asp Lys Lys Val Glu Pro Lys Ser Cys Ala Ala Ala
```

<210> SEQ ID NO 11
<211> LENGTH: 227
<212> TYPE: PRT
<213> ORGANISM: Artificial Sequence
<220> FEATURE:
<223> OTHER INFORMATION: Synthetic Construct

<400> SEQUENCE: 11

```
Glu Val Gln Leu Val Glu Ser Gly Gly Gly Val Val Gln Pro Gly Arg
1               5                   10                  15

Ser Leu Arg Leu Ser Cys Ala Ala Ser Gly Phe Thr Phe Ser Asn Tyr
            20                  25                  30

Ala Met His Trp Val Arg Gln Ala Pro Gly Lys Gly Leu Glu Trp Val
        35                  40                  45

Ala Leu Ile Ser Tyr Asp Gly Ser Ile Thr Tyr Tyr Ala Asp Ser Val
    50                  55                  60

Lys Gly Arg Phe Thr Ile Ser Arg Asp Asn Ser Lys Asp Thr Leu Tyr
65                  70                  75                  80

Leu Gln Met Asn Ser Leu Arg Pro Glu Asp Thr Thr Leu Tyr Tyr Cys
                85                  90                  95

Ala Arg Glu Arg Val Pro Tyr Asp Tyr Tyr Gly Met Ala Val Trp Gly
            100                 105                 110

Gln Gly Thr Thr Val Thr Val Ser Ala Ser Thr Lys Gly Pro Ser
        115                 120                 125

Val Phe Pro Leu Ala Pro Ser Ser Lys Ser Thr Ser Gly Gly Thr Ala
    130                 135                 140

Ala Leu Gly Cys Leu Val Lys Asp Tyr Phe Pro Glu Pro Val Thr Val
145                 150                 155                 160

Ser Trp Asn Ser Gly Ala Leu Thr Ser Gly Val His Thr Phe Pro Ala
                165                 170                 175

Val Leu Gln Ser Ser Gly Leu Tyr Ser Leu Ser Ser Val Val Thr Val
            180                 185                 190

Pro Ser Ser Ser Leu Gly Thr Gln Thr Tyr Ile Cys Asn Val Asn His
        195                 200                 205

Lys Pro Ser Asn Thr Lys Val Asp Lys Lys Val Glu Pro Lys Ser Cys
    210                 215                 220

Ala Ala Ala
225
```

<210> SEQ ID NO 12
<211> LENGTH: 227
<212> TYPE: PRT
<213> ORGANISM: Artificial Sequence
<220> FEATURE:
<223> OTHER INFORMATION: Synthetic Construct

<400> SEQUENCE: 12

```
Asp Val Gln Leu Val Glu Ser Gly Gly Gly Val Val Gln Pro Gly Arg
1               5                   10                  15

Ser Leu Arg Leu Ser Cys Ala Ala Ser Gly Phe Thr Phe Ser Asn Tyr
            20                  25                  30

Ala Met His Trp Val Arg Gln Ala Pro Gly Lys Gly Leu Glu Trp Val
        35                  40                  45

Ala Leu Ile Ser Tyr Asp Gly Ser Asn Lys Phe His Ala Asp Ser Val
    50                  55                  60
```

-continued

```
Lys Gly Arg Phe Thr Ile Ser Arg Asp Asn Ser Lys Ser Thr Leu Tyr
 65                  70                  75                  80

Leu Gln Met Asn Ser Leu Arg Ala Glu Asp Thr Ala Val Tyr Tyr Cys
                 85                  90                  95

Val Arg Glu Arg Val Pro Trp Asp Tyr Asp Gly Met Asp Val Trp Gly
            100                 105                 110

Gln Gly Thr Thr Val Thr Val Ser Ser Ala Ser Thr Lys Gly Pro Ser
        115                 120                 125

Val Phe Pro Leu Ala Pro Ser Ser Lys Ser Thr Ser Gly Gly Thr Ala
    130                 135                 140

Ala Leu Gly Cys Leu Val Lys Asp Tyr Phe Pro Glu Pro Val Thr Val
145                 150                 155                 160

Ser Trp Asn Ser Gly Ala Leu Thr Ser Gly Val His Thr Phe Pro Ala
                165                 170                 175

Val Leu Gln Ser Ser Gly Leu Tyr Ser Leu Ser Ser Val Val Thr Val
            180                 185                 190

Pro Ser Ser Ser Leu Gly Thr Gln Thr Tyr Ile Cys Asn Val Asn His
        195                 200                 205

Lys Pro Ser Asn Thr Lys Val Asp Lys Lys Val Glu Pro Lys Ser Cys
    210                 215                 220

Ala Ala Ala
225
```

```
<210> SEQ ID NO 13
<211> LENGTH: 227
<212> TYPE: PRT
<213> ORGANISM: Artificial Sequence
<220> FEATURE:
<223> OTHER INFORMATION: Synthetic Construct

<400> SEQUENCE: 13

Gln Val Gln Leu Leu Glu Ser Gly Gly Gly Val Val Gln Pro Gly Arg
  1               5                  10                  15

Ser Leu Arg Leu Ser Cys Ala Ala Ser Gly Phe Thr Phe Ser Ser Tyr
             20                  25                  30

Ala Met His Trp Val Arg Gln Ala Pro Gly Lys Gly Leu Glu Trp Leu
         35                  40                  45

Ala Ser Ile Ser Tyr Asp Gly Ser Asn Lys Phe His Ala Asp Ser Val
     50                  55                  60

Lys Gly Arg Phe Thr Ile Ser Arg Asp Asn Ser Lys Ser Thr Leu Tyr
 65                  70                  75                  80

Leu Gln Met Asn Ser Leu Arg Ala Glu Asp Thr Ala Val Tyr Tyr Cys
                 85                  90                  95

Val Arg Glu Arg Val Pro Trp Asp Tyr Asp Gly Met Asp Val Trp Gly
            100                 105                 110

Gln Gly Thr Thr Val Thr Val Ser Ser Ala Ser Thr Lys Gly Pro Ser
        115                 120                 125

Val Phe Pro Leu Ala Pro Ser Ser Lys Ser Thr Ser Gly Gly Thr Ala
    130                 135                 140

Ala Leu Gly Cys Leu Val Lys Asp Tyr Phe Pro Glu Pro Val Thr Val
145                 150                 155                 160

Ser Trp Asn Ser Gly Ala Leu Thr Ser Gly Val His Thr Phe Pro Ala
                165                 170                 175

Val Leu Gln Ser Ser Gly Leu Tyr Ser Leu Ser Ser Val Val Thr Val
            180                 185                 190
```

```
Pro Ser Ser Ser Leu Gly Thr Gln Thr Tyr Ile Cys Asn Val Asn His
            195                 200                 205

Lys Pro Ser Asn Thr Lys Val Asp Lys Lys Val Glu Pro Lys Ser Cys
210                 215                 220

Ala Ala Ala
225

<210> SEQ ID NO 14
<211> LENGTH: 227
<212> TYPE: PRT
<213> ORGANISM: Artificial Sequence
<220> FEATURE:
<223> OTHER INFORMATION: Synthetic Construct

<400> SEQUENCE: 14

Gln Val Gln Leu Val Glu Ser Gly Gly Gly Val Val Gln Pro Gly Arg
1               5                   10                  15

Ser Leu Arg Leu Ser Cys Ala Ala Ser Gly Phe Thr Phe Ser Ser Tyr
            20                  25                  30

Ala Met His Trp Val Arg Gln Ala Pro Gly Lys Gly Leu Glu Trp Leu
        35                  40                  45

Ala Ser Ile Ser Tyr Asp Gly Ser Asn Lys Phe His Ala Asp Ser Val
    50                  55                  60

Lys Gly Arg Phe Thr Ile Ser Arg Asp Asn Ser Lys Ser Thr Leu Tyr
65                  70                  75                  80

Leu Gln Met Asn Ser Leu Arg Ala Glu Asp Thr Ala Val Tyr Tyr Cys
                85                  90                  95

Val Arg Glu Arg Val Pro Trp Asp Tyr Asp Gly Met Asp Val Trp Gly
            100                 105                 110

Gln Gly Thr Thr Val Thr Val Ser Ser Ala Ser Thr Lys Gly Pro Ser
        115                 120                 125

Val Phe Pro Leu Ala Pro Ser Ser Lys Ser Thr Ser Gly Gly Thr Ala
    130                 135                 140

Ala Leu Gly Cys Leu Val Lys Asp Tyr Phe Pro Glu Pro Val Thr Val
145                 150                 155                 160

Ser Trp Asn Ser Gly Ala Leu Thr Ser Gly Val His Thr Phe Pro Ala
                165                 170                 175

Val Leu Gln Ser Ser Gly Leu Tyr Ser Leu Ser Ser Val Val Thr Val
            180                 185                 190

Pro Ser Ser Ser Leu Gly Thr Gln Thr Tyr Ile Cys Asn Val Asn His
        195                 200                 205

Lys Pro Ser Asn Thr Lys Val Asp Lys Lys Val Glu Pro Lys Ser Cys
210                 215                 220

Ala Ala Ala
225

<210> SEQ ID NO 15
<211> LENGTH: 110
<212> TYPE: PRT
<213> ORGANISM: Artificial Sequence
<220> FEATURE:
<223> OTHER INFORMATION: Synthetic Construct

<400> SEQUENCE: 15

Gln Ser Val Leu Thr Gln Pro Pro Ser Ala Ser Gly Thr Pro Gly Gln
1               5                   10                  15

Arg Val Thr Ile Ser Cys Ser Gly Gly Asn Ser Asn Ile Lys Ser Asn
            20                  25                  30
```

Thr Val Ser Trp Tyr Arg Gln Leu Pro Gly Ala Thr Pro Lys Leu Leu
            35                  40                  45

Ile Tyr Lys Thr Ser Gln Arg Pro Ser Gly Val Pro Asp Arg Phe Ser
    50                  55                  60

Gly Ser Lys Ser Asp Thr Ser Ala Thr Leu Asp Ile Ala Gly Leu Gln
65                  70                  75                  80

Thr Gly Asp Glu Ala Asp Tyr Tyr Cys Gly Thr Trp Asp Asn Ser Leu
                85                  90                  95

Ser Ser Val Val Phe Gly Gly Gly Thr Arg Val Thr Val Leu
            100                 105                 110

<210> SEQ ID NO 16
<211> LENGTH: 121
<212> TYPE: PRT
<213> ORGANISM: Artificial Sequence
<220> FEATURE:
<223> OTHER INFORMATION: Synthetic Construct

<400> SEQUENCE: 16

Asp Val Gln Leu Val Glu Ser Gly Gly Val Val Gln Pro Gly Arg
1               5                   10                  15

Ser Leu Arg Leu Ser Cys Ala Ala Ser Gly Phe Thr Phe Ser Asn Tyr
            20                  25                  30

Ala Met His Trp Val Arg Gln Ala Pro Gly Lys Gly Leu Glu Trp Val
            35                  40                  45

Ala Leu Ile Ser Tyr Asp Gly Ser Asn Lys Phe His Ala Asp Ser Val
    50                  55                  60

Lys Gly Arg Phe Thr Ile Ser Arg Asp Asn Ser Lys Ser Thr Leu Tyr
65                  70                  75                  80

Leu Gln Met Asn Ser Leu Arg Ala Glu Asp Thr Ala Val Tyr Tyr Cys
                85                  90                  95

Val Arg Glu Arg Val Pro Trp Asp Tyr Asp Gly Met Asp Val Trp Gly
            100                 105                 110

Gln Gly Thr Thr Val Thr Val Ser Ser
        115                 120

<210> SEQ ID NO 17
<211> LENGTH: 13
<212> TYPE: PRT
<213> ORGANISM: Artificial Sequence
<220> FEATURE:
<223> OTHER INFORMATION: Synthetic Construct

<400> SEQUENCE: 17

Ser Gly Gly Asn Ser Asn Ile Lys Ser Asn Thr Val Ser
1               5                   10

<210> SEQ ID NO 18
<211> LENGTH: 7
<212> TYPE: PRT
<213> ORGANISM: Artificial Sequence
<220> FEATURE:
<223> OTHER INFORMATION: Synthetic Construct

<400> SEQUENCE: 18

Lys Thr Ser Gln Arg Pro Ser
1               5

<210> SEQ ID NO 19
<211> LENGTH: 11

```
<212> TYPE: PRT
<213> ORGANISM: Artificial Sequence
<220> FEATURE:
<223> OTHER INFORMATION: Synthetic Construct

<400> SEQUENCE: 19

Gly Thr Trp Asp Asn Ser Leu Ser Ser Val Val
1               5                   10

<210> SEQ ID NO 20
<211> LENGTH: 10
<212> TYPE: PRT
<213> ORGANISM: Artificial Sequence
<220> FEATURE:
<223> OTHER INFORMATION: Synthetic Construct

<400> SEQUENCE: 20

Gly Phe Thr Phe Ser Asn Tyr Ala Met His
1               5                   10

<210> SEQ ID NO 21
<211> LENGTH: 10
<212> TYPE: PRT
<213> ORGANISM: Artificial Sequence
<220> FEATURE:
<223> OTHER INFORMATION: Synthetic Construct

<400> SEQUENCE: 21

Leu Ile Ser Tyr Asp Gly Ser Asn Lys Phe
1               5                   10

<210> SEQ ID NO 22
<211> LENGTH: 11
<212> TYPE: PRT
<213> ORGANISM: Artificial Sequence
<220> FEATURE:
<223> OTHER INFORMATION: Synthetic Construct

<400> SEQUENCE: 22

Glu Arg Val Pro Trp Asp Tyr Asp Gly Met Asp
1               5                   10

<210> SEQ ID NO 23
<211> LENGTH: 110
<212> TYPE: PRT
<213> ORGANISM: Artificial Sequence
<220> FEATURE:
<223> OTHER INFORMATION: Synthetic Construct

<400> SEQUENCE: 23

Gln Ser Val Leu Thr Gln Pro Pro Ser Val Ser Ala Ala Pro Gly Gln
1               5                   10                  15

Lys Val Thr Ile Ser Cys Ser Gly Ser Ala Ser Asn Ile Gly Ser Asn
            20                  25                  30

His Val Ser Trp Tyr Gln His Val Pro Gly Thr Ala Pro Gln Leu Leu
        35                  40                  45

Ile Tyr Asp Asp Lys Gln Arg Pro Ser Gly Ile Pro Asp Arg Phe Ser
    50                  55                  60

Gly Ser Lys Ser Gly Thr Ser Ala Ala Leu Ala Ile Thr Gly Leu Gln
65                  70                  75                  80

Thr Gly Asp Glu Ala Asp Tyr Tyr Cys Ala Thr Trp Asp Asn Ser Leu
                85                  90                  95

Ala Ser Ala Phe Phe Gly Gly Gly Thr Lys Leu Thr Val Leu
            100                 105                 110
```

```
<210> SEQ ID NO 24
<211> LENGTH: 121
<212> TYPE: PRT
<213> ORGANISM: Artificial Sequence
<220> FEATURE:
<223> OTHER INFORMATION: Synthetic Construct

<400> SEQUENCE: 24

Glu Val Gln Leu Val Glu Ser Gly Gly Val Val Gln Pro Gly Arg
1               5                   10                  15

Ser Leu Arg Leu Ser Cys Ala Ala Ser Gly Phe Thr Phe Ser Asn Tyr
            20                  25                  30

Ala Met His Trp Val Arg Gln Ala Pro Gly Lys Gly Leu Glu Trp Val
        35                  40                  45

Ala Leu Ile Ser Tyr Asp Gly Ser Ile Thr Tyr Tyr Ala Asp Ser Val
    50                  55                  60

Lys Gly Arg Phe Thr Ile Ser Arg Asp Asn Ser Lys Asp Thr Leu Tyr
65                  70                  75                  80

Leu Gln Met Asn Ser Leu Arg Pro Glu Asp Thr Thr Leu Tyr Tyr Cys
                85                  90                  95

Ala Arg Glu Arg Val Pro Tyr Asp Tyr Tyr Gly Met Ala Val Trp Gly
            100                 105                 110

Gln Gly Thr Thr Val Thr Val Ser Ser
        115                 120

<210> SEQ ID NO 25
<211> LENGTH: 13
<212> TYPE: PRT
<213> ORGANISM: Artificial Sequence
<220> FEATURE:
<223> OTHER INFORMATION: Synthetic Construct

<400> SEQUENCE: 25

Ser Gly Ser Ala Ser Asn Ile Gly Ser Asn His Val Ser
1               5                   10

<210> SEQ ID NO 26
<211> LENGTH: 7
<212> TYPE: PRT
<213> ORGANISM: Artificial Sequence
<220> FEATURE:
<223> OTHER INFORMATION: Synthetic Construct

<400> SEQUENCE: 26

Asp Asp Lys Gln Arg Pro Ser
1               5

<210> SEQ ID NO 27
<211> LENGTH: 11
<212> TYPE: PRT
<213> ORGANISM: Artificial Sequence
<220> FEATURE:
<223> OTHER INFORMATION: Synthetic Construct

<400> SEQUENCE: 27

Ala Thr Trp Asp Asn Ser Leu Ala Ser Ala Phe
1               5                   10

<210> SEQ ID NO 28
<211> LENGTH: 10
<212> TYPE: PRT
<213> ORGANISM: Artificial Sequence
```

```
<220> FEATURE:
<223> OTHER INFORMATION: Synthetic Construct

<400> SEQUENCE: 28

Gly Phe Thr Phe Ser Asn Tyr Ala Met His
1               5                   10

<210> SEQ ID NO 29
<211> LENGTH: 10
<212> TYPE: PRT
<213> ORGANISM: Artificial Sequence
<220> FEATURE:
<223> OTHER INFORMATION: Synthetic Construct

<400> SEQUENCE: 29

Leu Ile Ser Tyr Asp Gly Ser Ile Thr Tyr
1               5                   10

<210> SEQ ID NO 30
<211> LENGTH: 11
<212> TYPE: PRT
<213> ORGANISM: Artificial Sequence
<220> FEATURE:
<223> OTHER INFORMATION: Synthetic Construct

<400> SEQUENCE: 30

Glu Arg Val Pro Tyr Asp Tyr Tyr Gly Met Ala
1               5                   10

<210> SEQ ID NO 31
<211> LENGTH: 110
<212> TYPE: PRT
<213> ORGANISM: Artificial Sequence
<220> FEATURE:
<223> OTHER INFORMATION: Synthetic Construct

<400> SEQUENCE: 31

Gln Ser Val Val Thr Gln Pro Pro Ser Val Ser Ala Ala Pro Gly Gln
1               5                   10                  15

Glu Val Thr Ile Ser Cys Ser Gly Ser Ser Ser Asn Ile Gly Asn Asn
            20                  25                  30

Tyr Val Ser Trp Tyr Gln His Leu Pro Gly Thr Ala Pro Lys Leu Leu
        35                  40                  45

Ile Tyr Asp Ser Asp Lys Arg Pro Ser Gly Ile Pro Asp Arg Phe Ser
    50                  55                  60

Gly Ser Lys Ser Gly Thr Ser Ala Thr Leu Gly Val Thr Gly Leu Gln
65                  70                  75                  80

Thr Gly Asp Glu Ala Asp Tyr Tyr Cys Gly Thr Trp Asp Ser Leu
                85                  90                  95

Ser Ala Val Met Phe Gly Gly Gly Thr Lys Leu Thr Val Leu
                100                 105                 110

<210> SEQ ID NO 32
<211> LENGTH: 118
<212> TYPE: PRT
<213> ORGANISM: Artificial Sequence
<220> FEATURE:
<223> OTHER INFORMATION: Synthetic Construct

<400> SEQUENCE: 32

Gln Val Gln Leu Gln Glu Ser Gly Gly Gly Leu Val Gln Pro Gly Arg
1               5                   10                  15

Ser Leu Arg Leu Ser Cys Ala Ala Ser Gly Phe Thr Phe Ser Ser Tyr
```

```
                    20                  25                  30
Ala Met His Trp Val Arg Gln Ala Pro Gly Lys Gly Leu Glu Trp Val
                35                  40                  45
Ala Val Ile Ser Tyr Asp Gly Ser Asn Lys Tyr Tyr Ala Asp Ser Val
            50                  55                  60
Lys Gly Arg Phe Thr Ile Ser Arg Asp Asn Ser Lys Asn Thr Leu Tyr
65                  70                  75                  80
Leu Gln Met Asn Ser Leu Arg Ala Glu Asp Thr Ala Val Tyr Tyr Cys
                85                  90                  95
Ala Arg Asp Tyr Asp Trp Gln Tyr Phe Asp Tyr Trp Gly Gln Gly Thr
                100                 105                 110
Leu Val Thr Val Ser Ser
        115

<210> SEQ ID NO 33
<211> LENGTH: 13
<212> TYPE: PRT
<213> ORGANISM: Artificial Sequence
<220> FEATURE:
<223> OTHER INFORMATION: Synthetic Construct

<400> SEQUENCE: 33

Ser Gly Ser Ser Ser Asn Ile Gly Asn Asn Tyr Val Ser
1               5                   10

<210> SEQ ID NO 34
<211> LENGTH: 7
<212> TYPE: PRT
<213> ORGANISM: Artificial Sequence
<220> FEATURE:
<223> OTHER INFORMATION: Synthetic Construct

<400> SEQUENCE: 34

Asp Ser Asp Lys Arg Pro Ser
1               5

<210> SEQ ID NO 35
<211> LENGTH: 11
<212> TYPE: PRT
<213> ORGANISM: Artificial Sequence
<220> FEATURE:
<223> OTHER INFORMATION: Synthetic Construct

<400> SEQUENCE: 35

Gly Thr Trp Asp Ser Ser Leu Ser Ala Val Met
1               5                   10

<210> SEQ ID NO 36
<211> LENGTH: 10
<212> TYPE: PRT
<213> ORGANISM: Artificial Sequence
<220> FEATURE:
<223> OTHER INFORMATION: Synthetic Construct

<400> SEQUENCE: 36

Gly Phe Thr Phe Ser Ser Tyr Ala Met His
1               5                   10

<210> SEQ ID NO 37
<211> LENGTH: 10
<212> TYPE: PRT
<213> ORGANISM: Artificial Sequence
<220> FEATURE:
<223> OTHER INFORMATION: Synthetic Construct
```

<400> SEQUENCE: 37

Val Ile Ser Tyr Asp Gly Ser Asn Lys Tyr
1               5                   10

<210> SEQ ID NO 38
<211> LENGTH: 8
<212> TYPE: PRT
<213> ORGANISM: Artificial Sequence
<220> FEATURE:
<223> OTHER INFORMATION: Synthetic Construct

<400> SEQUENCE: 38

Asp Tyr Asp Trp Gln Tyr Phe Asp
1               5

<210> SEQ ID NO 39
<211> LENGTH: 110
<212> TYPE: PRT
<213> ORGANISM: Artificial Sequence
<220> FEATURE:
<223> OTHER INFORMATION: Synthetic Construct

<400> SEQUENCE: 39

Gln Ser Val Val Thr Gln Pro Pro Ser Val Ser Ala Ala Pro Gly Gln
1               5                   10                  15

Lys Val Thr Val Ser Cys Ser Gly Ser Asn Ser Asn Ile Gly Asp Asn
            20                  25                  30

Tyr Val Ser Trp Tyr Gln Leu Leu Pro Gly Thr Ala Pro Lys Leu Leu
        35                  40                  45

Ile Tyr Asp Asn Asn Lys Arg Pro Ser Gly Ile Leu Asp Arg Phe Ser
    50                  55                  60

Gly Ser Lys Ser Gly Thr Ser Ala Thr Leu Asp Ile Thr Gly Leu Gln
65                  70                  75                  80

Thr Gly Asp Glu Ala Asp Tyr Tyr Cys Gly Thr Trp Asp Ser Ser Leu
                85                  90                  95

Leu Thr Val Val Phe Gly Gly Gly Thr Lys Leu Thr Val Leu
            100                 105                 110

<210> SEQ ID NO 40
<211> LENGTH: 121
<212> TYPE: PRT
<213> ORGANISM: Artificial Sequence
<220> FEATURE:
<223> OTHER INFORMATION: Synthetic Construct

<400> SEQUENCE: 40

Gln Val Gln Leu Leu Glu Ser Gly Gly Gly Val Val Gln Pro Gly Arg
1               5                   10                  15

Ser Leu Arg Leu Ser Cys Ala Ala Ser Gly Phe Thr Phe Ser Ser Tyr
            20                  25                  30

Ala Met His Trp Val Arg Gln Ala Pro Gly Lys Gly Leu Glu Trp Leu
        35                  40                  45

Ala Ser Ile Ser Tyr Asp Gly Ser Asn Lys Phe His Ala Asp Ser Val
    50                  55                  60

Lys Gly Arg Phe Thr Ile Ser Arg Asp Asn Lys Ser Thr Leu Tyr
65                  70                  75                  80

Leu Gln Met Asn Ser Leu Arg Ala Glu Asp Thr Ala Val Tyr Tyr Cys
                85                  90                  95

Val Arg Glu Arg Val Pro Trp Asp Tyr Asp Gly Met Asp Val Trp Gly

Gln Gly Thr Thr Val Thr Val Ser Ser
        115                 120

<210> SEQ ID NO 41
<211> LENGTH: 13
<212> TYPE: PRT
<213> ORGANISM: Artificial Sequence
<220> FEATURE:
<223> OTHER INFORMATION: Synthetic Construct

<400> SEQUENCE: 41

Ser Gly Ser Asn Ser Asn Ile Gly Asp Asn Tyr Val Ser
1               5                   10

<210> SEQ ID NO 42
<211> LENGTH: 7
<212> TYPE: PRT
<213> ORGANISM: Artificial Sequence
<220> FEATURE:
<223> OTHER INFORMATION: Synthetic Construct

<400> SEQUENCE: 42

Asp Asn Asn Lys Arg Pro Ser
1               5

<210> SEQ ID NO 43
<211> LENGTH: 11
<212> TYPE: PRT
<213> ORGANISM: Artificial Sequence
<220> FEATURE:
<223> OTHER INFORMATION: Synthetic Construct

<400> SEQUENCE: 43

Gly Thr Trp Asp Ser Ser Leu Leu Thr Val Val
1               5                   10

<210> SEQ ID NO 44
<211> LENGTH: 10
<212> TYPE: PRT
<213> ORGANISM: Artificial Sequence
<220> FEATURE:
<223> OTHER INFORMATION: Synthetic Construct

<400> SEQUENCE: 44

Gly Phe Thr Phe Ser Ser Tyr Ala Met His
1               5                   10

<210> SEQ ID NO 45
<211> LENGTH: 10
<212> TYPE: PRT
<213> ORGANISM: Artificial Sequence
<220> FEATURE:
<223> OTHER INFORMATION: Synthetic Construct

<400> SEQUENCE: 45

Ser Ile Ser Tyr Asp Gly Ser Asn Lys Phe
1               5                   10

<210> SEQ ID NO 46
<211> LENGTH: 11
<212> TYPE: PRT
<213> ORGANISM: Artificial Sequence
<220> FEATURE:
<223> OTHER INFORMATION: Synthetic Construct

<400> SEQUENCE: 46

```
Glu Arg Val Pro Trp Asp Tyr Asp Gly Met Asp
1               5                   10
```

<210> SEQ ID NO 47
<211> LENGTH: 110
<212> TYPE: PRT
<213> ORGANISM: Artificial Sequence
<220> FEATURE:
<223> OTHER INFORMATION: Synthetic Construct

<400> SEQUENCE: 47

```
Gln Ser Val Leu Thr Gln Pro Pro Ser Val Ser Ala Ala Pro Gly Gln
1               5                   10                  15

Lys Val Thr Val Ser Cys Ser Gly Ser Ser Ser Asn Ile Gly Asn Asn
            20                  25                  30

Tyr Val Ser Trp Tyr Gln Leu Leu Pro Gly Thr Ala Pro Lys Leu Leu
        35                  40                  45

Ile Tyr Asp Asn Asn Lys Arg Pro Ser Gly Ile Leu Asp Arg Phe Ser
50                  55                  60

Gly Ser Lys Ser Gly Thr Ser Ala Thr Leu Asp Ile Thr Gly Leu Gln
65                  70                  75                  80

Thr Gly Asp Glu Ala Asp Tyr Tyr Cys Gly Thr Trp Asp Ser Ser Leu
                85                  90                  95

Ile Asn Val Val Phe Gly Gly Gly Thr Lys Val Thr Val Leu
            100                 105                 110
```

<210> SEQ ID NO 48
<211> LENGTH: 121
<212> TYPE: PRT
<213> ORGANISM: Artificial Sequence
<220> FEATURE:
<223> OTHER INFORMATION: Synthetic Construct

<400> SEQUENCE: 48

```
Gln Val Gln Leu Val Glu Ser Gly Gly Val Val Gln Pro Gly Arg
1               5                   10                  15

Ser Leu Arg Leu Ser Cys Ala Ala Ser Gly Phe Thr Phe Ser Ser Tyr
            20                  25                  30

Ala Met His Trp Val Arg Gln Ala Pro Gly Lys Gly Leu Glu Trp Leu
        35                  40                  45

Ala Ser Ile Ser Tyr Asp Gly Ser Asn Lys Phe His Ala Asp Ser Val
50                  55                  60

Lys Gly Arg Phe Thr Ile Ser Arg Asp Asn Ser Lys Ser Thr Leu Tyr
65                  70                  75                  80

Leu Gln Met Asn Ser Leu Arg Ala Glu Asp Thr Ala Val Tyr Tyr Cys
                85                  90                  95

Val Arg Glu Arg Val Pro Trp Asp Tyr Asp Gly Met Asp Val Trp Gly
            100                 105                 110

Gln Gly Thr Thr Val Thr Val Ser Ser
        115                 120
```

<210> SEQ ID NO 49
<211> LENGTH: 13
<212> TYPE: PRT
<213> ORGANISM: Artificial Sequence
<220> FEATURE:
<223> OTHER INFORMATION: Synthetic Construct

<400> SEQUENCE: 49

```
Ser Gly Ser Ser Ser Asn Ile Gly Asn Asn Tyr Val Ser
1               5                   10
```

<210> SEQ ID NO 50
<211> LENGTH: 7
<212> TYPE: PRT
<213> ORGANISM: Artificial Sequence
<220> FEATURE:
<223> OTHER INFORMATION: Synthetic Construct

<400> SEQUENCE: 50

```
Asp Asn Asn Lys Arg Pro Ser
1               5
```

<210> SEQ ID NO 51
<211> LENGTH: 11
<212> TYPE: PRT
<213> ORGANISM: Artificial Sequence
<220> FEATURE:
<223> OTHER INFORMATION: Synthetic Construct

<400> SEQUENCE: 51

```
Gly Thr Trp Asp Ser Ser Leu Ile Asn Val Val
1               5                   10
```

<210> SEQ ID NO 52
<211> LENGTH: 10
<212> TYPE: PRT
<213> ORGANISM: Artificial Sequence
<220> FEATURE:
<223> OTHER INFORMATION: Synthetic Construct

<400> SEQUENCE: 52

```
Gly Phe Thr Phe Ser Ser Tyr Ala Met His
1               5                   10
```

<210> SEQ ID NO 53
<211> LENGTH: 10
<212> TYPE: PRT
<213> ORGANISM: Artificial Sequence
<220> FEATURE:
<223> OTHER INFORMATION: Synthetic Construct

<400> SEQUENCE: 53

```
Ser Ile Ser Tyr Asp Gly Ser Asn Lys Phe
1               5                   10
```

<210> SEQ ID NO 54
<211> LENGTH: 11
<212> TYPE: PRT
<213> ORGANISM: Artificial Sequence
<220> FEATURE:
<223> OTHER INFORMATION: Synthetic Construct

<400> SEQUENCE: 54

```
Glu Arg Val Pro Trp Asp Tyr Asp Gly Met Asp
1               5                   10
```

<210> SEQ ID NO 55
<211> LENGTH: 9
<212> TYPE: PRT
<213> ORGANISM: Artificial Sequence
<220> FEATURE:
<223> OTHER INFORMATION: Synthetic Construct

<400> SEQUENCE: 55

```
Gly Ile Leu Gly Phe Val Phe Thr Leu
```

```
1               5

<210> SEQ ID NO 56
<211> LENGTH: 9
<212> TYPE: PRT
<213> ORGANISM: Artificial Sequence
<220> FEATURE:
<223> OTHER INFORMATION: Synthetic Construct

<400> SEQUENCE: 56

Ala Leu Asn Thr Ile Thr Asn Leu Lys
1               5

<210> SEQ ID NO 57
<211> LENGTH: 10
<212> TYPE: PRT
<213> ORGANISM: Artificial Sequence
<220> FEATURE:
<223> OTHER INFORMATION: Synthetic Construct

<400> SEQUENCE: 57

Lys Leu Val Val Val Gly Ala Cys Gly Val
1               5                   10

<210> SEQ ID NO 58
<211> LENGTH: 10
<212> TYPE: PRT
<213> ORGANISM: Artificial Sequence
<220> FEATURE:
<223> OTHER INFORMATION: Synthetic Construct
<220> FEATURE:
<221> NAME/KEY: VARIANT
<222> LOCATION: 8
<223> OTHER INFORMATION: ARS-1620(S-atropisomer)-modified cysteine

<400> SEQUENCE: 58

Lys Leu Val Val Val Gly Ala Cys Gly Val
1               5                   10

<210> SEQ ID NO 59
<211> LENGTH: 10
<212> TYPE: PRT
<213> ORGANISM: Artificial Sequence
<220> FEATURE:
<223> OTHER INFORMATION: Synthetic Construct

<400> SEQUENCE: 59

Val Val Val Gly Ala Cys Gly Val Gly Lys
1               5                   10

<210> SEQ ID NO 60
<211> LENGTH: 10
<212> TYPE: PRT
<213> ORGANISM: Artificial Sequence
<220> FEATURE:
<223> OTHER INFORMATION: Synthetic Construct
<220> FEATURE:
<221> NAME/KEY: VARIANT
<222> LOCATION: 6
<223> OTHER INFORMATION: ARS-1620(S-atropisomer)-modified cysteine

<400> SEQUENCE: 60

Val Val Val Gly Ala Cys Gly Val Gly Lys
1               5                   10

<210> SEQ ID NO 61
<211> LENGTH: 10
<212> TYPE: PRT
```

```
<213> ORGANISM: Artificial Sequence
<220> FEATURE:
<223> OTHER INFORMATION: Synthetic Construct
<220> FEATURE:
<221> NAME/KEY: VARIANT
<222> LOCATION: 3
<223> OTHER INFORMATION: ARS-1620(S-atropisomer)-modified cysteine

<400> SEQUENCE: 61

Gly Ala Cys Gly Val Gly Lys Ser Ala Leu
1               5                   10

<210> SEQ ID NO 62
<211> LENGTH: 9
<212> TYPE: PRT
<213> ORGANISM: Artificial Sequence
<220> FEATURE:
<223> OTHER INFORMATION: Synthetic Construct
<220> FEATURE:
<221> NAME/KEY: VARIANT
<222> LOCATION: 5
<223> OTHER INFORMATION: ARS-1620(S-atropisomer)-modified cysteine

<400> SEQUENCE: 62

Val Val Gly Ala Cys Gly Val Gly Lys
1               5

<210> SEQ ID NO 63
<211> LENGTH: 9
<212> TYPE: PRT
<213> ORGANISM: Artificial Sequence
<220> FEATURE:
<223> OTHER INFORMATION: Synthetic Construct
<220> FEATURE:
<221> NAME/KEY: VARIANT
<222> LOCATION: 5
<223> OTHER INFORMATION: ARS-1620(S-atropisomer)-modified cysteine

<400> SEQUENCE: 63

Val Val Gly Phe Cys Gly Val Gly Lys
1               5

<210> SEQ ID NO 64
<211> LENGTH: 9
<212> TYPE: PRT
<213> ORGANISM: Artificial Sequence
<220> FEATURE:
<223> OTHER INFORMATION: Synthetic Construct
<220> FEATURE:
<221> NAME/KEY: VARIANT
<222> LOCATION: 5
<223> OTHER INFORMATION: ARS-1620(S-atropisomer)-modified cysteine

<400> SEQUENCE: 64

Val Val Gly Ala Cys Phe Val Gly Lys
1               5

<210> SEQ ID NO 65
<211> LENGTH: 9
<212> TYPE: PRT
<213> ORGANISM: Artificial Sequence
<220> FEATURE:
<223> OTHER INFORMATION: Synthetic Construct
<220> FEATURE:
<221> NAME/KEY: VARIANT
<222> LOCATION: 5
<223> OTHER INFORMATION: ARS-1620(S-atropisomer)-modified cysteine

<400> SEQUENCE: 65

Val Val Gly Arg Cys Arg Val Gly Lys
```

```
<210> SEQ ID NO 66
<211> LENGTH: 12
<212> TYPE: PRT
<213> ORGANISM: Artificial Sequence
<220> FEATURE:
<223> OTHER INFORMATION: Synthetic Construct
<220> FEATURE:
<221> NAME/KEY: VARIANT
<222> LOCATION: 10
<223> OTHER INFORMATION: ARS-1620(S-atropisomer)-modified cysteine

<400> SEQUENCE: 66

Val Val Val Glu Pro Gln Gln Gln Leu Cys Gln Lys
1               5                   10
```

CHEMICALLY CONTROLLED MONOCLONAL ANTIBODY TARGET ENGAGEMENT

CROSS-REFERENCE TO RELATED APPLICATIONS

This application is a national stage application under 35 U.S.C. § 371 of International Application No. PCT/US2020/041710, filed Jul. 10, 2020, which claims benefit of U.S. Provisional Application No. 62/873,505, filed Jul. 12, 2019, the disclosure of each of which is hereby incorporated by reference in its entirety.

STATEMENT REGARDING FEDERALLY SPONSORED RESEARCH OR DEVELOPMENT

This invention was made with government support under Grant Nos. R01 CA190408 and P41 CA196726 awarded by the National Institutes of Health. The government has certain rights in the invention.

SUBMISSION OF SEQUENCE LISTING AS ASCII TEXT FILE

The content of the following submission on ASCII text file is incorporated herein by reference in its entirety: a computer readable form (CRF) of the Sequence Listing (file name: 643662002400SEQLIST.TXT, date recorded: Jan. 10, 2022, size: 40,786 bytes.

TECHNICAL FIELD

The present disclosure relates generally to antibodies reactive with tumor-specific neoantigens, as well as neoantigen-binding fragments thereof. The present disclosure also relates to nucleic acids, expression cassettes, and expression vectors encoding the antibodies and neoantigen-binding fragments. The antibodies and neoantigen binding-fragments are useful for diagnosis and treatment of cancer.

BACKGROUND

The selective modulation of a patient's immune system through cancer immunotherapy has emerged as a powerful therapeutic strategy. This therapeutic shift towards modulation of an entire system of cells has shown great promise, even demonstrating the potential for cures in a subset of patients. The protein and cell-based efforts modulate immune responses through the specific recognition of tumor antigens or immune cell receptors/ligands at the cell surface. Despite this success, these approaches are limited by the requirement for extracellular recognition, significantly restricting potential target antigens to those accessible at the cell surface. Additionally, many current immunotherapies target upregulated proteins rather than tumor-specific antigens, resulting in "on-target/off-tumor" toxicities.

The immune system natively monitors intracellular proteins through antigen presentation on major histocompatibility complex (MHC) class I. Short peptides (8-11 amino acids) derived from proteasomal degradation of proteins are loaded onto complexes and presented on the cell surface as peptide-MHCs (pMHCs). These complexes serve as a readout of intracellular health and are natively surveyed by T-cells for foreign antigens. Recently, however, the specific targeting of tumor-associated pMHCs with immunotherapy has been found to be a powerful therapeutic strategy (Tran et al., New England Journal of Medicine 375, 2255-2262, 2016; and Dao et al., Nature Biotechnology 33, 1079-1086, 2015). The specific recognition of a pMHC can be achieved with either a T-cell receptor (native or engineered) or an engineered antibody fragment. While targeting tumor-associated pMHCs has shown promise, it is fundamentally restricted in scope due to allelic restriction. Allelic restriction refers to the requirement for a specific MHC allele to be present in order to present the antigenic peptide and form the complete, trimeric antigen. Unfortunately, MHC genes are highly polymorphic and there are over 10,000 identified variants in the human population, all with a unique set of peptides that they preferentially present (Rock et al., Trends in Immunology 37, 724-737, 2016). The enormous breadth of human MHC alleles means that immunotherapies targeting native pMHCs will only work for the subset of patients who possess MHC allele(s) capable of presenting the target peptide for T-cell recognition. T-cells are required to make direct contact with the presenting MHC molecule during immune development, meaning T cell receptors (TCRs) are unlikely to be cross reactive with the same target peptide presented by different. Similarly, while recognition of pMHCs with engineered antibody fragments theoretically does not require the antibody epitope to contain residues of the presenting MHC allele, in practice the antibody binding site is typically not restricted to the peptide component of the pMHC (Chang et al., Expert Opin Biol Ther 16, 979-987, 2016). Therefore, targeting native pMHCs with either TCRs or antibody fragments are strategies that are likely to benefit a small subset of patients in need of immunotherapy.

As such, the art needs tumor-specific therapies capable directing an immune response to intracellular oncoproteins in a diverse cancer patient population. The direct targeting of intracellular oncoproteins would significantly widen the therapeutic window by reducing potential "on-target/off-tumor" side effects.

BRIEF SUMMARY

The present disclosure relates generally to antibodies reactive with tumor-specific neoantigens, as well as neoantigen-binding fragments thereof. The present disclosure also relates to nucleic acids, expression cassettes, and expression vectors encoding the antibodies and neoantigen-binding fragments. The antibodies and neoantigen binding-fragments are useful for diagnosis and treatment of cancer.

BRIEF DESCRIPTION OF THE DRAWINGS

FIG. 2A shows an alignment of the light chain sequences of the ARS-1620-binding fragments described in Example 1: P1A4 (SEQ ID NO: 5); P2F10 (SEQ ID NO:6); P2F11 (SEQ ID NO:7); P1C1 also known as P2G5 (SEQ ID NO:8); and P1H6 (SEQ ID NO:9).

FIG. 2B shows an alignment of the heavy chain sequences of the ARS-1620-binding fragments described in Example 1: P1A4 (SEQ ID NO:10); P2F10 (SEQ ID NO:11); P2F11 (SEQ ID NO:12); P1C1 also known as P2G5 (SEQ ID NO:13); and P1H6 (SEQ ID NO:14).

FIG. 4A and FIG. 4B show that P1A4 IgG can detect ARS-1620 on the surface of treated cells. A P1A4 IgG preferentially stains cells of three KRas G12C cell lines (H358, MiaPaca-2, and SW1573). Low background staining observed in the presence of DMSO treatment confirms that the interaction is ARS-1620 dependent.

DETAILED DESCRIPTION

The present disclosure relates generally to antibodies reactive with tumor-specific neoantigens, as well as neoantigen-binding fragments thereof. The present disclosure also relates to nucleic acids, expression cassettes, and expression vectors encoding the antibodies and neoantigen-binding fragments. The antibodies and neoantigen binding-fragments are useful for diagnosis and treatment of cancer.

Identification of Neoantigen-Reactive Antibodies

Figure 1:
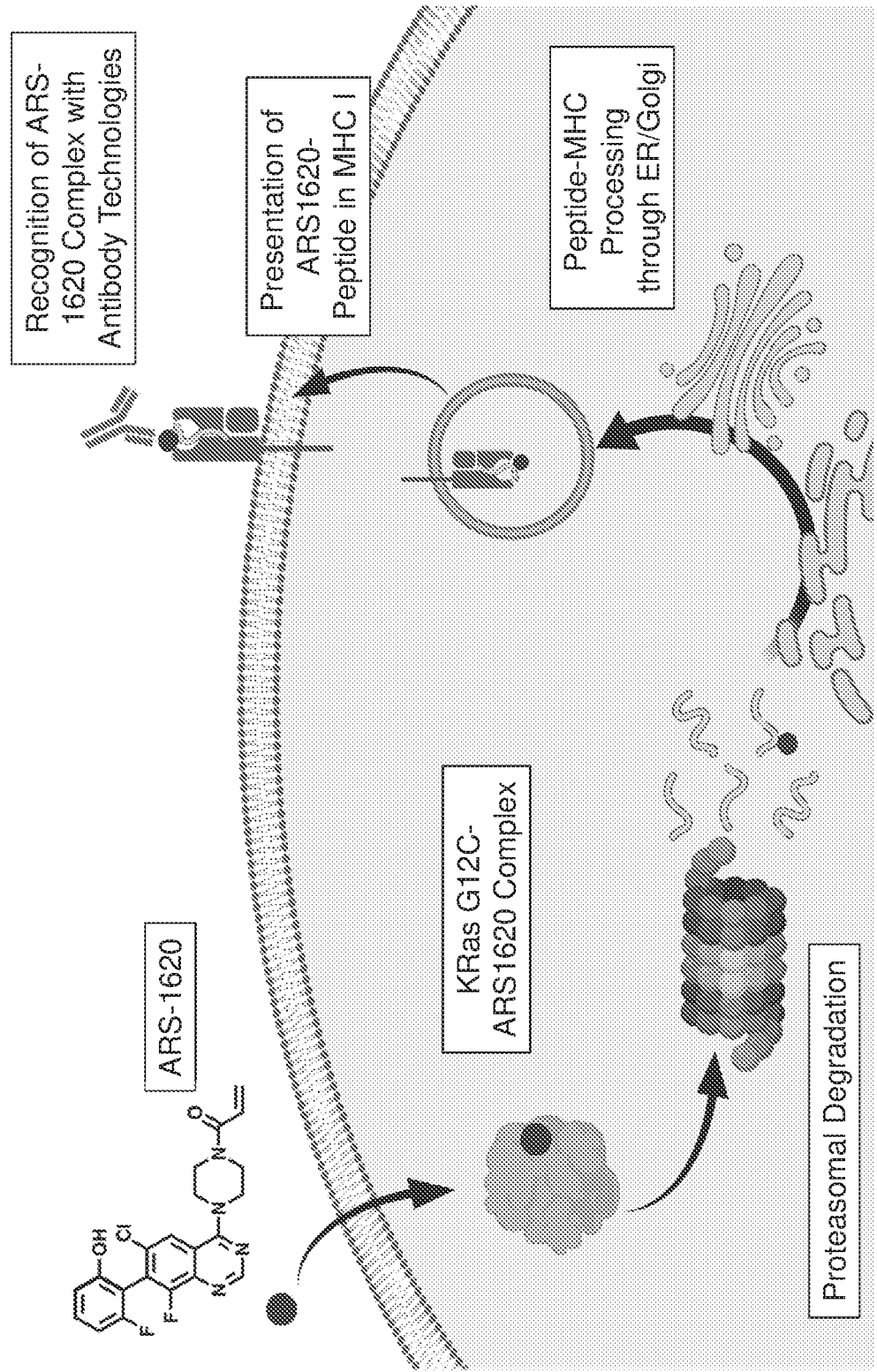
FIG. 1 is a schematic showing how the CheCmATE approach works with KRas G12C/ASR-1620 model system by using the antigen presentation pathway to bring mutated KRas peptides to the cell surface in pMHCs. ARS-1620 covalently binds to the cysteine residue of KRas G12C, then the complex is degraded by the proteasome, and ARS-1620-bound peptides are presented in MHC class I molecules on the cell surface as neoantigens for recognition by antibodies.

The present disclosure details a powerful approach, referred to herein as "Chemically Controlled monoclonal Antibody Target Engagement", or "CheCmATE" by using tumor-specific chemical reactivities to create neoantigens that can be recognized in pMHCs without allelic restriction (FIG. 1). This is accomplished by using an oncoprotein-specific hapten that covalently reacts in a tumor-specific manner to create a neoantigen. Specific recognition of the hapten by engineered antibodies serves to direct an immune response against cancer cells presenting haptenized peptides as pMHCs on their cell surfaces. A "hapten" is a small molecular weight compound that elicits an immune response only when covalently linked to a larger "carrier" molecule such as a protein, but not on its own (Erkes et al., J Immunol Res, 2014:175265, 2014). Initially, acquired cysteines on oncoproteins were targeted for haptenization as the acquired cysteines represent chemically-reactive handles that effectively distinguish between healthy and cancerous cells (Visscher et al., Current Opinion in Chemical Biology 30, 61-67, 2016). Non-cancerous cells should not produce the neoantigen since the wild type protein lacks the cysteine required for reaction with the hapten. By engineering an antibody specific to the small molecule hapten using the CheCmATE approach instead of to a single pMHC, covalently modified peptides presented by any MHC molecule on the cell surface can be targeted as long as the hapten is reasonably solvent-exposed. In this way, MHC and even carrier peptide specificities are bypassed, resulting in reasonably selective hapten reactivity. This means that any potential proteasomal degradation product containing the modified cysteine successfully loaded into any MHC allele should form a competent epitope for targeting with the CheCmATE approach. Additionally, antibodies reactive with an oncoprotein-specific hapten could be suitable for use as a monotherapy, such antibodies are also fundamentally synergistic with irreversible inhibitors. This means that oncoprotein-specific, irreversible inhibitors that already exist or are in development can be repurposed with the CheCmATE approach as combination therapies or as an option in case resistance to the targeted inhibitor monotherapy.

Using pharmacological perturbation to create neo-epitopes for immuno-targeting represents a new modality that combines the strength of small molecule- and protein-based therapeutics. The CheCmATE approach has numerous advantages. 1) Oncogenic drivers are directly targeted as they are intrinsically tumor-specific and required for tumor maintenance. 2) Though the tumor-specific antigen is intracellular, antigen presentation brings peptide fragments to the cell surface. 3) Inhibiting the function of the tumor-specific antigen is not necessary since the small molecule serves primarily as a haptenizing agent. 4) Because the approach relies on the existence rather than inhibition of a tumor-specific antigen, it can retain efficacy even in the case of resistance to the small molecule as long as it is still able to covalently bind the target. 5) Full target engagement is unnecessary since substoichiometric target engagement can be sufficient to generate hapten-pMHCs. 6) As the immunotherapy effect is hapten-mediated, the relatively acute exposure provided by the orally bioavailable small molecule hapten allows tighter temporal control over the potentially damaging side effects common to immunotherapies, which are typically affected by long-lived species like antibodies and engineered cells.

As proof of concept, the CheCmATE approach was tested in an exemplary model system involving a commonly mutated oncogene having a mutation resulting in an acquired cysteine, namely KRas G12C. Antibodies specific to the preclinical KRas G12C inhibitor ARS-1620 were identified and characterized. However, CheCmATE approach is not limited to the KRas G12C oncoprotein, or the targeted covalent inhibitor, ARS-1620. Other oncoprotein targets include but are not limited to NRAS G12C, KRAS G13C, FGFR3 R248C, FGFR3 S249C, FGFR3 G370C, FGFR3 Y373C, TP53 Y220C, TP53 R273C, IDH1 R132C, GNAS R201C, FBXW7 R465C, CTNNB1 S33C, CTNNB1 S37C, and DNMT3A R882. Structures of exemplary targeted covalent inhibitors of KRas G12C are shown in Table I.

ARS-1620 shows high specificity for KRas G12C over other cellular proteins and shows no appreciable binding to wild type KRas lacking acquired cysteine (Visscher et al., Current Opinion in Chemical Biology, 30:61-67, 2016). One antibody, P1A4, was found to detect ARS-1620 modified peptides in pMHCs on the cell surface of KRas G12C cell lines treated with ARS-1620 and the MHC presentation of ARS-1620 was found to be sufficient to recruit a cytotoxic T-cell response through a bispecific T-cell engager (BiTE) incorporating the ARS-1620-binding fragment of P1A4.

TABLE I

Exemplary KRas G12C Targeted Covalent Inhibitors

| Compound | Structure |
|---|---|
| ARS-1620<br>CAS<br>1698055-85-4 | 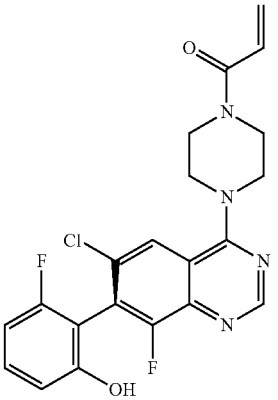 |
| reduced<br>ARS-1620<br>analogue | 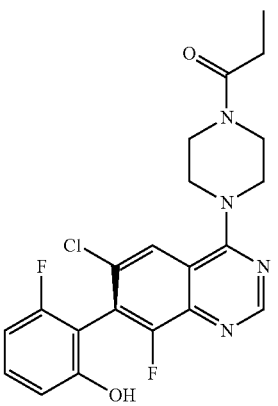 |
| AMG 510<br>CAS<br>2252403-56-6 | 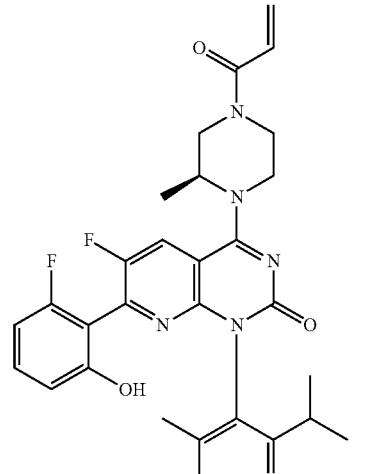 |
| MRTX849<br>CAS<br>2326521-71-3 | 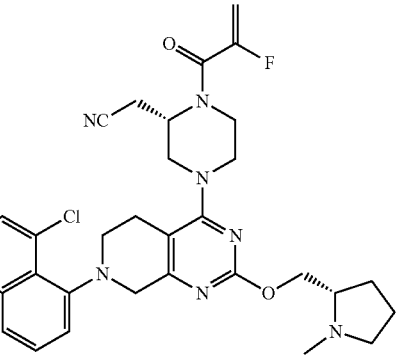 |

Using a hapten on the outside of a cancer cell has been demonstrated to recruit an anti-cancer immune response (Rullo et al., Angewandte Chemie International Edition 55, 3642-3646, 2016), and covalently modified peptides derived from intracellular proteins have been shown to be presented in pMHCs (Padovan et al., Eur J Immunol, 27:1303-1307, 1997; and Martin and Weltzien, Int Arch Allergy Immunol, 104:10-16, 1994). However, the present disclosure is believed to be the first to show that a haptenized pMHC can be directly targeted as an immunotherapy approach against intracellular oncoproteins. Moreover, the CheCmATE approach is the first approach to target pMHCs of intracellular antigens in a completely MHC allele and peptide (register/orientation) agnostic way.

Thus, in one aspect the present disclosure provides methods for identifying a neoantigen-reactive antibody, comprising: (a) providing a neoantigen comprising a small molecule (e.g., molecular weight of about 1,000 daltons or less), covalent inhibitor bound to a cysteine residue of a protein fragment that is from 8-18 residues in length; (b) contacting the neoantigen with a library comprising a plurality of antibodies under conditions suitable for binding at least one antibody of the plurality of antibodies to the neoantigen; and (c) recovering the at least one antibody bound to the neoantigen to identify the neoantigen-reactive antibody. In preferred embodiments, the protein is an oncoprotein and the cysteine residue is an acquired cysteine residue that was not present in the proto-oncoprotein.

Definitions

To facilitate an understanding of the embodiments disclosed herein, a number of terms and phrases are defined below. Terms and abbreviations not defined should be accorded their ordinary meaning as used in the art.

As used herein and in the appended claims, the singular forms "a," "an," and "the" include plural references unless indicated otherwise. For example, "a" monocyte includes one or more monocytes.

The phrase "comprising" as used herein is open-ended, indicating that such embodiments may include additional elements. In contrast, the phrase "consisting of" is closed, indicating that such embodiments do not include additional elements (except for trace impurities). The phrase "consisting essentially of" is partially closed, indicating that such embodiments may further comprise elements that do not materially change the basic characteristics of such embodiments. It is understood that aspects and embodiments described herein as "comprising" include "consisting of" and "consisting essentially of" embodiments.

The term "about" as used herein in reference to a value, encompasses from 90% to 110% of that value (e.g., about 20 amino acids refers to 18 amino acids to 22 amino acids and includes 20 amino acids).

Numerical ranges are inclusive of the numbers defining the range (e.g., 18 to 22 amino acids encompasses 18, 19, 20, 21 and 22 amino acids).

The term "plurality" as used herein in reference to an object refers to three or more objects. For instance, "a plurality of multimers" refers to three or more multimers, preferably 3, 4, 5, 6, 7, 8, 9, 10, 100, 1,000, 10,000, 100,000, 1,000,000 or more multimers.

As used herein, the term "isolated" refers to an object (e.g., monocyte) that is removed from its natural environment (e.g., separated). "Isolated" objects are at least 50% free, preferably 75% free, more preferably at least 90% free, and most preferably at least 95% (e.g., 95%, 96%, 97%, 98%, or 99%) free from other components with which they are naturally associated.

The term "neoantigen" refers to a newly formed antigen. In the context of the present disclosure, the term "neoantigen" refers to an antigen that is formed upon binding of a small molecule, covalent inhibitor to an enzyme of a mammalian subject.

An "effective amount" of an agent disclosed herein is an amount sufficient to carry out a specifically stated purpose. An "effective amount" may be determined empirically in relation to the stated purpose. An "effective amount" or an "amount sufficient" of an agent is that amount adequate to affect a desired biological effect, such as a beneficial result, including a beneficial clinical result. The term "therapeutically effective amount" refers to an amount of an agent (e.g., neoantigen-reactive antibody) effective to "treat" a disease or disorder in a subject (e.g., a mammal such as a human). An "effective amount" or an "amount sufficient" of an agent or agents may be administered in one or more doses.

The terms "treating" or "treatment" of a disease refer to executing a protocol, which may include administering one or more drugs to an individual (human or otherwise), in an effort to alleviate a sign or symptom of the disease. Thus, "treating" or "treatment" does not require complete alleviation of signs or symptoms, does not require a cure, and specifically includes protocols that have only a palliative effect on the individual. As used herein, and as well-understood in the art, "treatment" is an approach for obtaining beneficial or desired results, including clinical results. Beneficial or desired clinical results include, but are not limited to, alleviation or amelioration of one or more symptoms, diminishment of extent of disease, stabilized (i.e., not worsening) state of disease, preventing spread of disease, delay or slowing of disease progression, amelioration or palliation of the disease state, and remission (whether partial or total), whether detectable or undetectable. "Treatment" can also mean prolonging survival as compared to expected survival of an individual not receiving treatment. "Palliating" a disease or disorder means that the extent and/or undesirable clinical manifestations of the disease or disorder are lessened and/or time course of progression of the disease or disorder is slowed, as compared to the expected untreated outcome. Further, palliation and treatment do not necessarily occur by administration of one dose, but often occur upon administration of a series of doses.

"Treating" cancer means to bring about a beneficial clinical result such as causing remission or otherwise prolonging survival as compared to expected survival in the absence of treatment. In some embodiments, "treating" cancer comprises shrinking the size of a tumor or otherwise reducing viable cancer cell numbers. In other embodiments, "treating" cancer comprises delaying growth of a tumor.

ENUMERATED EMBODIMENTS

1. An antibody or antigen binding fragment thereof, wherein the antibody or fragment binds to an antigen comprising the amino acid sequence GAC(1620)GVGKSAL (SEQ ID NO:2) but not the amino acid sequence GACGVGKSAL (SEQ ID NO:1).

2. The antibody or fragment of embodiment 1, wherein the antibody or fragment is human or humanized.

3. An anti-ARS-1620 antibody or ARS-1620-binding fragment thereof, comprising:
   (a) a light chain variable region comprising a CDRL1 of SEQ ID NO:33, a CDRL2 of SEQ ID NO:34, CDRL3 of SEQ ID NO:35, and a heavy chain variable region comprising a CDRH1 of SEQ ID NO:36, a CDRH2 of SEQ ID NO:37, and a CDRH3 of SEQ ID NO:38;
   (b) a light chain variable region comprising a CDRL1 of SEQ ID NO:25, a CDRL2 of SEQ ID NO:26, CDRL3 of SEQ ID NO:27, and a heavy chain variable region comprising a CDRH1 of SEQ ID NO:28, a CDRH2 of SEQ ID NO:29, and a CDRH3 of SEQ ID NO:30;
   (c) a light chain variable region comprising a CDRL1 of SEQ ID NO:17, a CDRL2 of SEQ ID NO:18, CDRL3 of SEQ ID NO:19, and a heavy chain variable region comprising a CDRH1 of SEQ ID NO:20, a CDRH2 of SEQ ID NO:21, and a CDRH3 of SEQ ID NO:22;
   (d) a light chain variable region comprising a CDRL1 of SEQ ID NO:41, a CDRL2 of SEQ ID NO:42, CDRL3 of SEQ ID NO:43, and a heavy chain variable region comprising a CDRH1 of SEQ ID NO:44, a CDRH2 of SEQ ID NO:45, and a CDRH3 of SEQ ID NO:46; or
   (e) a light chain variable region comprising a CDRL1 of SEQ ID NO:49, a CDRL2 of SEQ ID NO:50, CDRL3 of SEQ ID NO:51, and a heavy chain variable region comprising a CDRH1 of SEQ ID NO:52, a CDRH2 of SEQ ID NO:53, and a CDRH3 of SEQ ID NO:54.

4. The antibody or fragment of embodiment 3, comprising: (i) a light chain comprising the amino acid sequence of SEQ ID NO:5 and a heavy chain comprising the amino acid sequence of SEQ ID NO:10; or (ii) wherein the light chain variable region comprises the amino acid sequence of SEQ ID NO:31 and the heavy chain variable region comprises the amino acid sequence of SEQ ID NO:32.

5. The antibody or fragment of embodiment 3, comprising: (i) a light chain comprising the amino acid sequence of SEQ ID NO:6 and a heavy chain comprising the amino acid sequence of SEQ ID NO:11; or (ii) wherein the light chain variable region comprises the amino acid sequence of SEQ ID NO:23 and the heavy chain variable region comprises the amino acid sequence of SEQ ID NO:24.

6. The antibody or fragment of embodiment 3, comprising: (i) a light chain comprising the amino acid sequence of SEQ ID NO:7 and a heavy chain comprising the amino acid sequence of SEQ ID NO:12; or (ii) wherein the light chain variable region comprises the amino acid sequence of SEQ ID NO:15 and the heavy chain variable region comprises the amino acid sequence of SEQ ID NO:16.

7. The antibody or fragment of embodiment 3, comprising: (i) a light chain comprising the amino acid sequence of SEQ ID NO:8 and a heavy chain comprising the amino acid sequence of SEQ ID NO:13; or (ii) wherein the light chain variable region comprises the amino acid sequence of SEQ ID NO:39 and the heavy chain variable region comprises the amino acid sequence of SEQ ID NO:40.

8. The antibody or fragment of embodiment 3, comprising: (i) a light chain comprising the amino acid sequence of SEQ ID NO:9 and a heavy chain comprising the amino acid sequence of SEQ ID NO:14; or (ii) wherein the light chain variable region comprises the amino acid sequence of SEQ ID NO:47 and the heavy chain variable region comprises the amino acid sequence of SEQ ID NO:48.

9. The antibody or fragment of any one of embodiments 1-8, wherein the antibody or fragment is a fragment, preferably wherein the fragment is selected from the group consisting of a Fab, F(ab')$_2$, Fv and Sfv.

10. The antibody or fragment of any one of embodiments 1-8, wherein the antibody or fragment, is a full-length human immunoglobulin g (IgG) antibody, optionally wherein the IgG is an IgG1 or an IgG4.

11. The antibody or fragment of any one of embodiments 1-8, wherein the antibody or fragment comprises:
(a) a bispecific antibody, optionally wherein the bispecific antibody is in a format selected from the group consisting of a bispecific IgG (BsIgG), an appended IgG, a bispecific antibody fragment, a bispecific fusion protein, and a bispecific antibody conjugate; or
(b) a trispecific antibody.

12. The antibody or fragment of any one of embodiments 1-8, wherein the antibody or fragment comprises a bispecific T-cell engager (BiTE).

13. The antibody or fragment of any one of embodiments 1-8, wherein the antibody or fragment comprises a chimeric antigen receptor (CAR).

14. An immunoconjugate comprising the antibody or fragment of any one of embodiments 1-8 and a detectable marker or cytotoxic agent.

15. The immunoconjugate of embodiment 14, wherein the immunoconjugate comprises a detectable marker, optionally wherein the detectable marker is selected from the group consisting of a radioisotope, a metal chelator, an enzyme, a fluorescent compound, a bioluminescent compound, and a chemiluminescent compound.

16. The immunoconjugate of embodiment 14, wherein the immunoconjugate comprises a cytotoxic agent, optionally wherein the cytotoxic agent is selected from the group consisting of an alkylating agent, antimetabolite, mitotic inhibitor, antineoplastic antibiotic, and toxin.

17. An isolated nucleic acid encoding the antibody or fragment of any one of embodiments 1-13.

18. An expression cassette comprising the nucleic acid of embodiment 17, in operable combination with a regulatory sequence.

19. A host cell comprising the expression cassette of embodiment 18 or an expression vector comprising the expression cassette.

20. A method for the production of a recombinant antibody or fragment thereof, the method comprising:
a) culturing the host cell of embodiment 19 under conditions suitable for expression of the antibody or fragment; and
b) recovering the antibody or fragment from the host cell or cell culture supernatant.

21. A method for characterizing a biopsy sample from a patient, comprising:
a) contacting the sample with the antibody or fragment of any one of embodiments 1-8 or the immunoconjugate of embodiment 15; and
b) detecting the binding of the antibody or fragment to cells of the sample.

22. A method for treating cancer, the method comprising: administering to a patient with cancer an effective amount of the antibody or fragment of any one of embodiments 1-13 or the immunoconjugate of embodiment 16, wherein the patient has received or is receiving an effective amount of ARS-1620.

23. The method of embodiment 22, wherein the cancer is an advanced solid tumor, such as a metastatic or unresectable tumor.

24. The method of embodiment 22 or embodiment 23, wherein the cancer is a carcinoma, optionally wherein the cancer is a non-small cell lung carcinoma (NSCLC), a colorectal adenocarcinoma (CRC), or a pancreatic adenocarcinoma.

25. A method for treating cancer, the method comprising: administering to a patient with cancer an effective amount of a neoantigen-specific antibody or antigen-binding fragment thereof, wherein the patient has received or is receiving an effective amount of a targeted covalent inhibitor of an oncoprotein expressed in cells of the cancer such that a neoantigen is formed by binding of the inhibitor to the oncoprotein.

26. A method for treating cancer, the method comprising: administering to a patient with cancer an effective amount of a targeted covalent inhibitor of an oncoprotein expressed in cells of the cancer such that a neoantigen is formed by binding of the inhibitor to the oncoprotein; and
administering to the patient an effective amount of a neoantigen-specific antibody or antigen-binding fragment thereof.

27. The method of embodiment 25 or 26, wherein the neoantigen is presented on the surface of the cancer cells as a peptide major histocompatibility complex (pMHC).

28. The method of embodiment 26 or embodiment 27, wherein the inhibitor binds to an acquired cysteine residue of the oncoprotein.

29. The method of embodiment 28, wherein the oncoprotein is a kirsten rat sarcoma virus homolog (Kras) with a G12C mutation.

30. The method of embodiment 29, wherein the inhibitor is selected from the group consisting of ARS-1620, AMG 510, JNJ-74699157 (ARS-3248), and MRTX849, optionally wherein the inhibitor is ARS-1620, optionally wherein the inhibitor is AMG 510, optionally wherein the inhibitor is JNJ-74699157 (ARS-3248), or optionally wherein the inhibitor is MRTX849.

31. The method of any one of embodiments 26-30, wherein the cancer is an advanced solid tumor such as a metastatic or unresectable tumor.

32. The method of embodiment any one of embodiments 26-31, wherein the cancer is a carcinoma.

33. The method of embodiment 33, wherein the cancer is a non-small cell lung carcinoma (NSCLC), a colorectal adenocarcinoma (CRC), or a pancreatic adenocarcinoma.

34. The method of embodiment 28, wherein the oncoprotein is selected from the group consisting of NRAS G12C, KRAS G13C, FGFR3 R248C, FGFR3 S249C, FGFR3 G370C, FGFR3 Y373C, TP53 Y220C, TP53 R273C, IDH1 R132C, GNAS R201C, FBXW7 R465C, CTNNB1 S33C, CTNNB1 S37C, and DNMT3A R882.

35. A method for identifying a neoantigen-specific antibody, the method comprising:
(a) providing a neoantigen comprising a targeted covalent inhibitor bound to an acquired cysteine residue of an oncoprotein fragment, wherein the fragment is from 8-18 residues in length;
(b) contacting the neoantigen with a library comprising a plurality of antibodies under conditions suitable for binding at least one antibody of the plurality of antibodies to the neoantigen; and
(c) recovering the at least one antibody bound to the neoantigen.

36. The method of embodiment 35, wherein the oncoprotein is selected from the group consisting of NRAS G12C, KRAS G12C, KRAS G13C, FGFR3 R248C, FGFR3 S249C, FGFR3 G370C, FGFR3 Y373C, TP53 Y220C, TP53 R273C, IDH1 R132C, GNAS R201C, FBXW7 R465C, CTNNB1 S33C, CTNNB1 S37C, and DNMT3A R882, optionally wherein the oncoprotein is KRAS G12C.

37. The method of embodiment 35 or embodiment 36, wherein the oncoprotein fragment is a synthetic peptide.

38. The method of any one of embodiments 35-37, wherein the oncoprotein fragment is bound to class I molecule (heavy chain and beta-2-microglobulin) as a pMHC.

39. The method of embodiment 38, wherein the oncoprotein is KRAS G12C and the inhibitor is ARS-1620, AMG 510, JNJ-74699157 (ARS-3248), or MRTX849, optionally wherein the inhibitor is ARS-1620, optionally wherein the inhibitor is AMG 510, optionally wherein the inhibitor is JNJ-74699157 (ARS-3248), or optionally wherein the inhibitor is MRTX849.

40. The method of any one of embodiments 35-37, wherein the oncoprotein fragment is bound to a class II molecule (alpha and beta chains) as a pMHC.

EXAMPLES

The present disclosure is described in further detail in the following examples which are not in any way intended to limit the scope of the disclosure as ed. The attached figures are meant to be considered as integral parts of the specification and description of the disclosure. The following examples are offered to illustrate, but not to limit the claimed disclosure.

In the experimental disclosure which follows, the following abbreviations apply: BiTE (Bispecific T cell Engager); BLI (biolayer interferometry); BsAb (bispecific antibody); CAR (chimeric antigen receptor); CDR (complementarity determining region); CheCmATE (Chemically Controlled monoclonal Antibody Target Engagement); Fab (antigen-binding fragment); IgG (immunoglobulin G); MHC (major histocompatibility complex); pMHC (peptide MHC); TCR (T cell receptor).

Example 1: Anti-ARS-1620 Antibodies for KRas G12C Directed Immune Targeting

This example describes the isolation and characterization of antigen-binding fragments (Fabs) that react with a tumor-specific neoantigen. The neoantigen is produced by attachment of an oncoprotein-specific hapten (ARS-1620) to an oncoprotein (KRas G12C), followed by processing and presentation on the cell surface as a peptide-MHC (pMHC).

ARS-1620-specific Fabs were isolated using the Craik lab panning platform with a human, naïve Fab-phage display library (Duriseti et al., J Biol Chem 285, 26878-26888, 2010). In order to bias the Fabs away from MHC allelic restriction, the Fabs were panned against a minimal antigen of a KRas G12C 10-mer peptide labeled with ARS-1620 on cysteine. As this antigen did not contain any MHC molecules (no 02-microglobulin light chain or class I heavy chain), the binders were biased towards peptidic and small molecule epitopes. From a Fab-phage library with a diversity of $4 \times 10^{10}$, four rounds of panning were conducted, resulting in the identification of five unique Fabs that all bind with high affinity to ARS-1620. To screen for binding determinants, biolayer interferometry (BLI) was used with a suite of four peptides. BLI quantifies the on-rate (association-increasing binding (nm) to plateau) and the off-rate (dissociation-decaying binding (nm) starting around 400 s). Together these rates are used to calculate a dissociation constant, $K_D$. The sequence of the peptides is shown in Table 1-1. The N-terminal glycine residues of each peptide were attached to biotin. The four peptides included the 10-mer KRas peptide (G12C) with and without ARS-1620 (1620), the 10-mer peptide labeled with an atropisomer of ARS-1620 (1620e*), and a poly-glycine 10-mer peptide (PolyG) with an ARS-1620 modified cysteine in the same position as on the KRas-derived peptide.

TABLE 1-1

| Peptides^ | | |
|---|---|---|
| Peptide | Origin | Sequence |
| G12C | Kras | GACGVGKSAL (SEQ ID NO: 1) |
| G12C-1620 (S-atropisomer) | Kras | GAC(1620)GVGKSAL (SEQ ID NO: 2) |
| G12C-1620e* (R-atropisomer) | Kras | GAC(1620e*)GVGKSAL (SEQ ID NO: 3) |
| PolyG-1620 (S-atropisomer) | control | GGC(1620)GGGGGG-Nle (SEQ ID NO: 4) |
| CEF1 | influenza | GILGFVFTL (SEQ ID NO: 55) |
| ALN (MHC 15) | yellow fever | ALNTITNLK (SEQ ID NO: 56) |
| K5 | Kras | KLVVVGACGV (SEQ ID NO: 57) |
| K5-1620 | Kras | KLVVVGAC(1620)GV (SEQ ID NO: 58) |
| V7 | Kras | VVVGACGVGK (SEQ ID NO: 59) |

TABLE 1-1-continued

Peptides^

| Peptide | Origin | Sequence |
|---|---|---|
| V7-1620 | Kras | VVVGAC(1620)GVGK (SEQ ID NO: 60) |
| G10-1620 | Kras | GAC(1620)GVGKSAL (SEQ ID NO: 61) |
| V8-1620 | Kras | VVGAC(1620)GVGK (SEQ ID NO: 62) |
| V8(A11F)-1620 | Kras | VVGFC(1620)GVGK (SEQ ID NO: 63) |
| V8(G13F)-1620 | Kras | VVGAC(1620)FVGK (SEQ ID NO: 64) |
| V8(A11R + G13R)-1620 | Kras | VVGRC(1620)RVGK (SEQ ID NO: 65) |
| AHR2-1620 | off target | VVVEPQQQLC(1620)QK (SEQ ID NO: 66) |

^Unless otherwise noted, ARS-1620 modification of cysteine is with the S-atropisomer.

All Fabs showed high affinity for the KRas-ARS-1620 peptide but no detectable affinity for the unlabeled KRas peptide, indicating the small molecule is the primary binding determinant. Additionally, all Fabs bound the ARS-1620-labeled poly-glycine peptide with a similar affinity to the labeled KRas peptide, indicating that recognition is largely side chain agnostic and likely to occur in any context as long as the ARS-1620 is accessible. Additionally, an alanine scan of the KRas peptide revealed only minor side chain determinants for each of the five Fabs, indicating that carrier peptide identity likely influences affinity but not to a large degree. Moreover, four of the five Fabs showed only minimal binding to the KRas peptide labeled with the ARS-1620 atropisomer indicating the binding to ARS-1620 is a specific event rather than a non-specific hydrophobic contact. One of the five Fabs, P1A4, showed no detectable binding to the atropisomer indicating a highly specific recognition of ARS-1620.

TABLE 1-2

Fab Dissociation Constants ($K_D$ in nM)

| Peptide | P2G5 | P1A4 | P1H6 | P2F10 | P2F11 |
|---|---|---|---|---|---|
| G12C | nd | nd | nd | nd | nd |
| G12C-1620 | 51.2 | 25.1 | 14.3 | 18.3 | 16.5 |
| G12C-1620e* | some | nd | some | some | some |
| PolyG-1620 | 85.4 | 39.0 | 24.6 | 14.1 | 21.7 | nd = not detectable.

The Fab specificities were confirmed with differential scanning fluorimetry (DSF) where all Fabs showed strong stabilization with ARS-1620 containing peptides or free small molecule (ΔTm=6-12° C.) but minimal stabilization (ΔTm=1.5-4.5° C.) with a KRas peptide labeled with an atropisomer of ARS-1620. Alignments of the amino acid sequences of the light chains (SEQ ID NOs: 5-9) and the heavy chains (SEQ ID NOs:10-14) of the Fabs are shown in FIGS. 2A-2B, and the amino acid sequences of the variable regions and complementarity determining regions (CDRs) of the Fabs are shown in Table 1-3. Overall, this data demonstrates that the Chemically Controlled monoclonal Antibody Target Engagement (CheCmATE) approach was successful in identification of five unique Fabs that all bind ARS-1620 with high affinity and in a variety of contexts.

TABLE 1-3

Anti-ARS-1620 Fab Sequences

| Region | P2F11 Sequence |
|---|---|
| LCVR | QSVLTQPPSASGTPGQRVTISCSGG NSNIKSNTVSWYRQLPGATPKLLIY KTSQRPSGVPDRFSGSKSDTSATLD IAGLQTGDEADYYCGTWDNSLSSVV FGGGTRVTVL (SEQ ID NO: 15) |
| HCVR | DVQLVESGGGVVQPGRSLRLSCAAS GFTFSNYAMHWVRQAPGKGLEWVAL ISYDGSNKFHADSVKGRFTISRDNS KSTLYLQMNSLRAEDTAVYYCVRER VPWDYDGMDVWGQGTTVTSS (SEQ ID NO: 16) |
| CDRL1 | SGGNSNIKSNTVS (SEQ ID NO: 17) |
| CDRL2 | KTSQRPS (SEQ ID NO: 18) |
| CDRL3 | GTWDNSLSSVV (SEQ ID NO: 19) |
| CDRH1 | GFTFSNYAMH (SEQ ID NO: 20) |
| CDRH2 | LISYDGSNKF (SEQ ID NO: 21) |
| CDRH3 | ERVPWDYDGMD (SEQ ID NO: 22) |
| Region | P2F10 Sequence |
| LCVR | QSVLTQPPSVSAAPGQKVTISCSGS ASNIGSNHVSWYQHVPGTAPQLLIY DDKQRPSGIPDRFSGSKSGTSAALA ITGLQTGDEADYYCATWDNSLASAF FGGGTKLTVL (SEQ ID NO: 23) |
| HCVR | EVQLVESGGGVVQPGRSLRLSCAAS GFTFSNYAMHWVRQAPGKGLEWVAL ISYDGSITYYADSVKGRFTISRDNS KDTLYLQMNSLRPEDTTLYYCARER VPYDYYGMAVWGQGTTVTSS (SEQ ID NO: 24) |
| CDRL1 | SGSASNIGSNHVS (SEQ ID NO: 25) |
| CDRL2 | DDKQRPS (SEQ ID NO: 26) |
| CDRL3 | ATWDNSLASAF (SEQ ID NO: 27) |
| CDRH1 | GFTFSNYAMH (SEQ ID NO: 28) |
| CDRH2 | LISYDGSITY (SEQ ID NO: 29) |
| CDRH3 | ERVPYDYYGMA (SEQ ID NO: 30) |
| Region | P1A4 Sequence |
| LCVR | QSVVTQPPSVSAAPGQEVTISCSGS SSNIGNNYVSWYQHLPGTAPKLLIY DSDKRPSGIPDRFSGSKSGTSATLG VTGLQTGDEADYYCGTWDSSLSAVM |

TABLE 1-3-continued

| Anti-ARS-1620 Fab Sequences | |
|---|---|
| | FGGGTKLTVL (SEQ ID NO: 31) |
| HCVR | QVQLQESGGGLVQPGRSLRLSCAAS GFTFSSYAMHWVRQAPGKGLEWVAV ISYDGSNKYYADSVKGRFTISRDNS KNTLYLQMNSLRAEDTAVYYCARDY DWQYFDYWGQGTLVTVSS (SEQ ID NO: 32) |
| CDRL1 | SGSSSNIGNNYVS (SEQ ID NO: 33) |
| CDRL2 | DSDKRPS (SEQ ID NO: 34) |
| CDRL3 | GTWDSSLSAVM (SEQ ID NO: 35) |
| CDRH1 | GFTFSSYAMH (SEQ ID NO: 36) |
| CDRH2 | VISYDGSNKY (SEQ ID NO: 37) |
| CDRH3 | DYDWQYFD (SEQ ID NO: 38) |
| Region | P1C1(P2G5) Sequence |
| LCVR | QSVVTQPPSVSAAPGQKVTVSCSGS NSNIGDNYVSWYQLLPGTAPKLLIY DNNKRPSGILDRFSGSKSGTSATLD ITGLQTGDEADYYCGTWDSSLLTVV FGGGTKLTVL (SEQ ID NO: 39) |
| HCVR | QVQLLESGGGVVQPGRSLRLSCAAS GFTFSSYAMHWVRQAPGKGLEWLAS ISYDGSNKFHADSVKGRFTISRDNS KSTLYLQMNSLRAEDTAVYYCVRER VPWDYDGMDVWGQGTTVTVSS (SEQ ID NO: 40) |
| CDRL1 | SGSNSNIGDNYVS (SEQ ID NO: 41) |
| CDRL2 | DNNKRPS (SEQ ID NO: 42) |
| CDRL3 | GTWDSSLLTVV (SEQ ID NO: 43) |
| CDRH1 | GFTFSSYAMH (SEQ ID NO: 44) |
| CDRH2 | SISYDGSNKF (SEQ ID NO: 45) |
| CDRH3 | ERVPWDYDGMD (SEQ ID NO: 46) |
| Region | P1H6 Sequence |
| LCVR | QSVLTQPPSVSAAPGQKVTVSCSGS SSNIGNNYVSWYQLLPGTAPKLLIY DNNKRPSGILDRFSGSKSGTSATLD ITGLQTGDEADYYCGTWDSSLINVV FGGGTKVTVL (SEQ ID NO: 47) |
| HCVR | QVQLVESGGGVVQPGRSLRLSCAAS GFTFSSYAMHWVRQAPGKGLEWLAS ISYDGSNKFHADSVKGRFTISRDNS KSTLYLQMNSLRAEDTAVYYCVRER VPWDYDGMDVWGQGTTVTVSS (SEQ ID NO: 48) |

TABLE 1-3-continued

| Anti-ARS-1620 Fab Sequences | |
|---|---|
| CDRL1 | SGSSSNIGNNYVS (SEQ ID NO: 49) |
| CDRL2 | DNNKRPS (SEQ ID NO: 50) |
| CDRL3 | GTWDSSLINVV (SEQ ID NO: 51) |
| CDRH1 | GFTFSSYAMH (SEQ ID NO: 52) |
| CDRH2 | SISYDGSNKF (SEQ ID NO: 53) |
| CDRH3 | ERVPWDYDGMD (SEQ ID NO: 54) |

Binding of the P1A4 Fab was further assessed by measuring its affinity by BLI against a wider variety of peptide antigens. The amino acid sequence of the ARS-1620 labeled peptides is shown in Table 1-1 and the affinity of P1A4 for the peptides is shown in Table 1-4. Overall, P1A4 shows no affinity for these peptides when unlabeled and very similar affinity when these peptides have been modified by ARS-1620. This confirms that P1A4 is a broad, ARS-1620 binding antibody.

TABLE 1-4

P1A4 Fab Binds Various ARS-1620 Labeled Peptides with Similar Affinity

| Peptide | Affinity (nM) |
|---|---|
| G10-1620 (SEQ ID NO: 61) | 25 |
| K5-1620 (SEQ ID NO: 58) | 23 |
| V8-1620 (SEQ ID NO: 62) | 54 |
| V8(A11F)-1620 (SEQ ID NO: 63) | 56 |
| V8(A13F)-1620 (SEQ ID NO: 64) | 56 |
| V8(A11R + G13R)-1620 (SEQ ID NO: 65) | 41 |
| AHR2 (SEQ ID NO: 66) | 51 |
| PolyG-1620 (SEQ ID NO: 4) | 40 |

Figure 8:
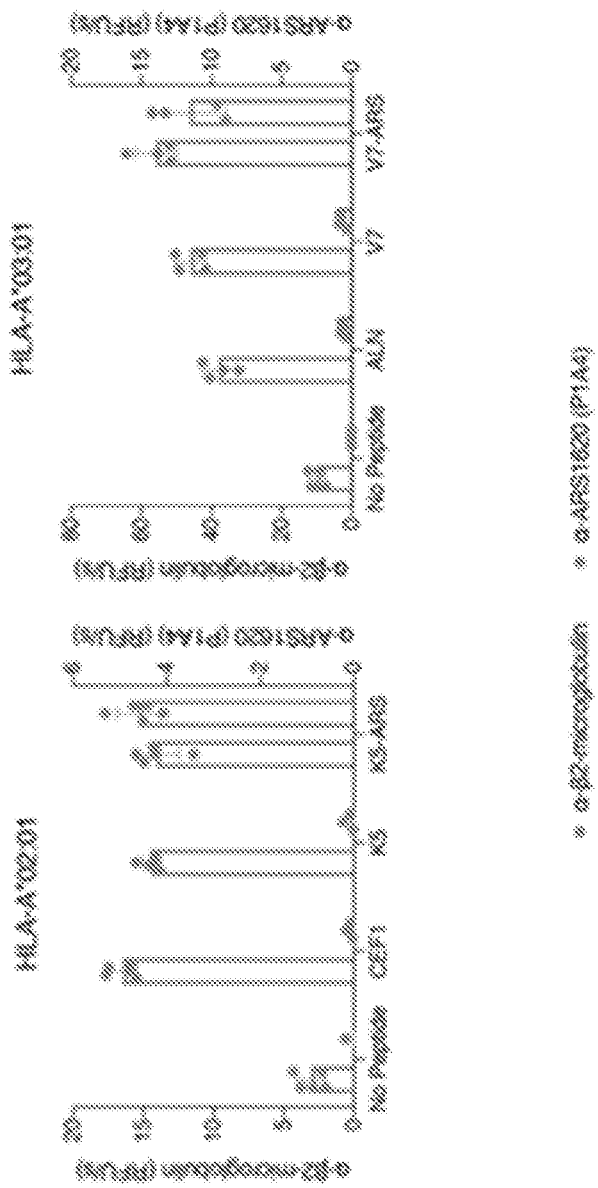
FIG. 8 shows that P1A4 is able to bind to other ARS-1620 haptenated pMHCs of different human alleles (HLA-A*02:01 and HLA-A*03:01).
Figure 9:
FIG. 9 shows that ARS-1620 haptenated pMHCs are stable and targetable on the cell surface.

To further elucidate the structural details of the interaction between P1A4 and ARS1620, a 2.0-Å crystal structure of the P1A4 Fab bound to a reduced, non-electrophilic analogue of ARS1620 was solved. The CDRs of P1A4 form a deep (about 12-Å) pocket between the heavy and light chains that ARS1620 is able to access. With its hydroxyfluorophenyl moiety anchoring deep in the pocket through hydrogen bonding with aspartic acid (D99) of P1A4 CDRH3, ARS1620 positions its electrophilic acrylamide group towards the solvent, making little to no direct contact with the Fab. This binding pose is consistent with the peptide-agnostic binding profile of P1A4, and suggests that P1A4 may be able to bind a variety of antigens where ARS1620 is sterically accessible.

Whether P1A4 is able to bind ARS1620-haptenated MHCs was subsequently assessed. An in vitro MHC class I refolding ELISA was performed using an anti-B2m antibody to detect total, stable MHC class I molecules and a P1A4 IgG-HRP conjugate for detection of targetable, haptenated MHC class I molecules. Haptenation with ARS-1620 did not strongly perturb the ability of K-Ras peptides to form stable MHC class I molecules. Satisfyingly, P1A4 was able to bind all ARS1620 labeled, K-Ras-derived MHC class I molecules and showed no binding to matched unlabeled MHC class I molecules. P1A4 readily bound K-Ras(G12C)-derived haptenated MHC class I molecules of multiple class I heavy chain alleles, confirming that direct targeting of the ARS1620 inhibitor allowed relaxation of allelic restriction (FIG. 8). P1A4 also stained T2 cells pulsed with a haptenated, HLA-A*02:01 binding KRas peptide (K5-ARS), but not T2 cells pulsed with the matched, unlabeled peptide (K5) or T2 cells pulsed with an ARS-1620 haptenated peptide that does not bind the HLA-A*02:01 allele (V7-ARS). These results confirm that a haptenated KRas peptide (K5-ARS) is able to form stable pMHCs in cells and that P1A4 effectively binds these haptenated pMHCs on the cell surface (FIG. 9).

Figures 3A, 3B:
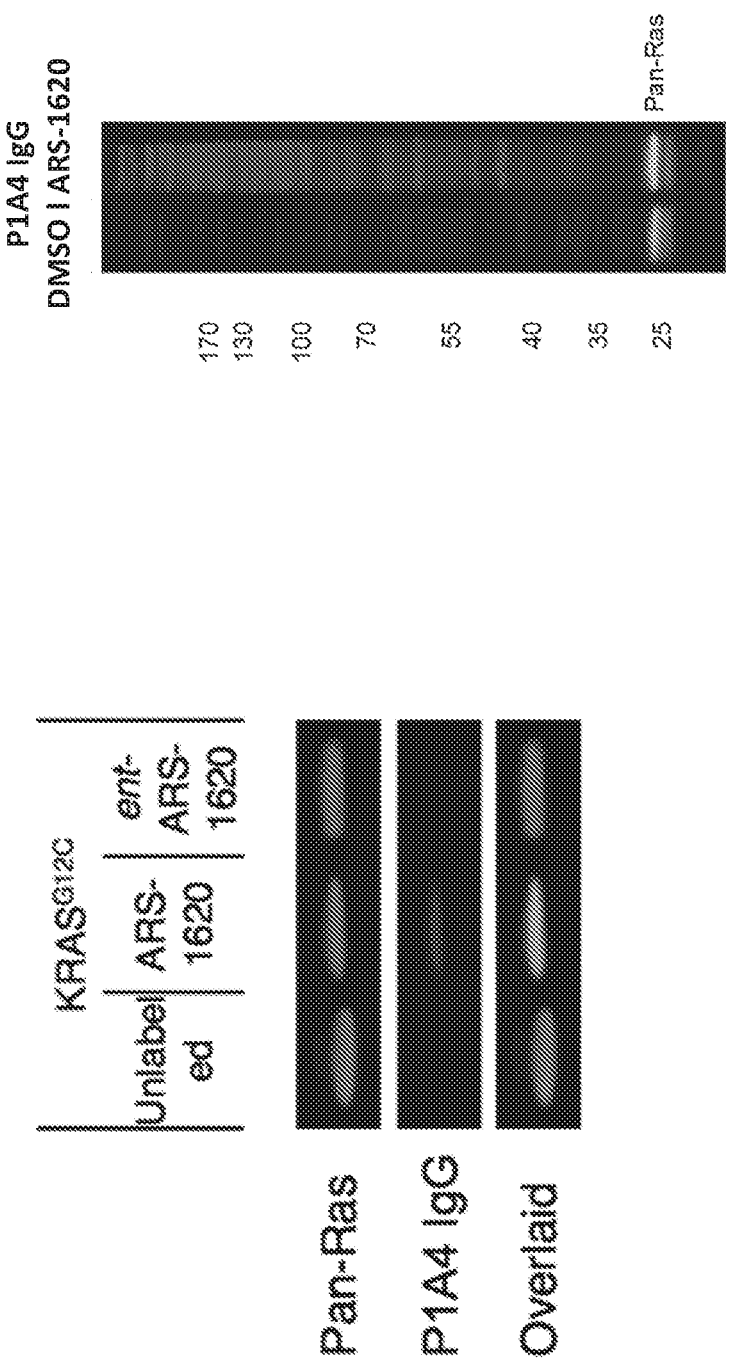
FIG. 3A shows that P1A4 IgG effectively stains ARS-1620 labeled KRas with high specificity and without background staining of unlabeled KRas or atropisomer (ent-ARS-1620) labeled KRas.
FIG. 3B shows a western blot indicating that P1A4 IgG does not stain a cell lysate from untreated H358 (G12C+) cells. However, P1A4 IgG stained many ARS-1620 labeled cellular proteins in a cell lysate from treated H358 (G12C+) cells. This indicates that there are significant off-targets for ARS-1620 not previously elaborated with clickable ARS-1620 analogues and mass spectrometry.
Figure 4A:
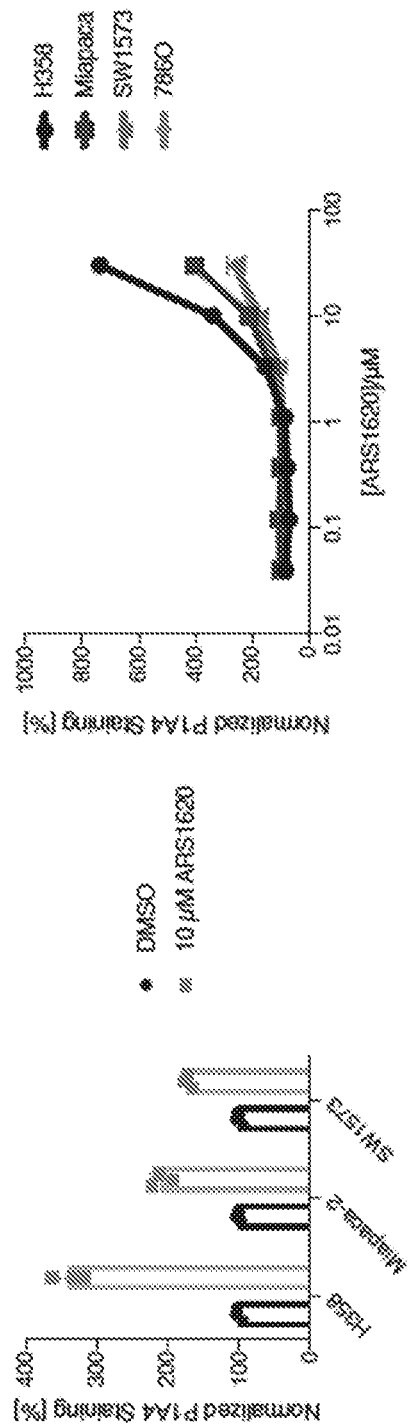

Due to its exquisite specificity for ARS-1620, experiments were carried out with P1A4 in cell line models of KRas G12C cancers. A western blot using H358 (G12C+) cell lysate with a P1A4 IgG confirmed that P1A4 shows no background binding to any proteins in the absence of ARS-1620 treatment, but effectively stains labeled proteins upon treatment (FIG. 3A). While previous reports have demonstrated by mass spectrometry that ARS-1620 primarily labels KRas G12C in a cellular context (Janes et al., Cell, 172:578-589, 2018), a western blot with P1A4 shows additional off-targets of ARS-1620 (FIG. 3B). Detection of cell-surface accessible ARS-1620 using flow cytometry with P1A4 confirms that ARS-1620 is detectable on the cell surface of treated cells (FIG. 4A-4B). Despite the off-targets detected via western blot, flow cytometry shows a significant increase (10×) in cell surface ARS-1620 in several KRas G12C cell lines compared to a wild type KRas cell line, indicating a potential therapeutic window despite the small molecule not being completely tumor-specific in its reactivity.

Figure 5:
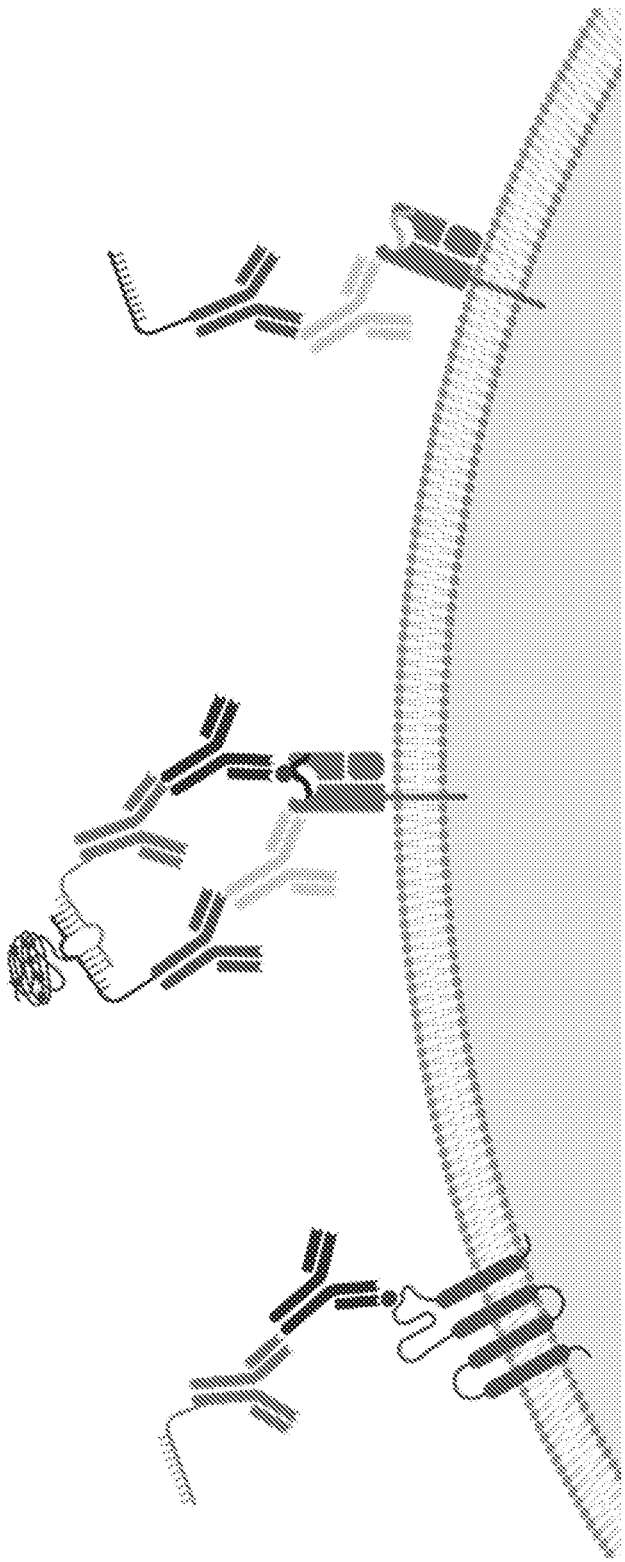
FIG. 5 is a schematic of the proximity ligation assay (PLA) for detecting colocalization of two antigens. A murine antibody against MHC (W6/32) and a human antibody against ARS-1620 (P1A4) are used as primary antibodies. Secondary antibodies are directed against the Fc region of the human or murine antibodies, and are attached to complimentary oligos used to assemble a complementary oligo for rolling circle amplification (RCA). Amplification only occurs if the two antigens are colocalized, and amplified oligos are detected with complimentary, fluorogenic oligos.
Figure 6A:
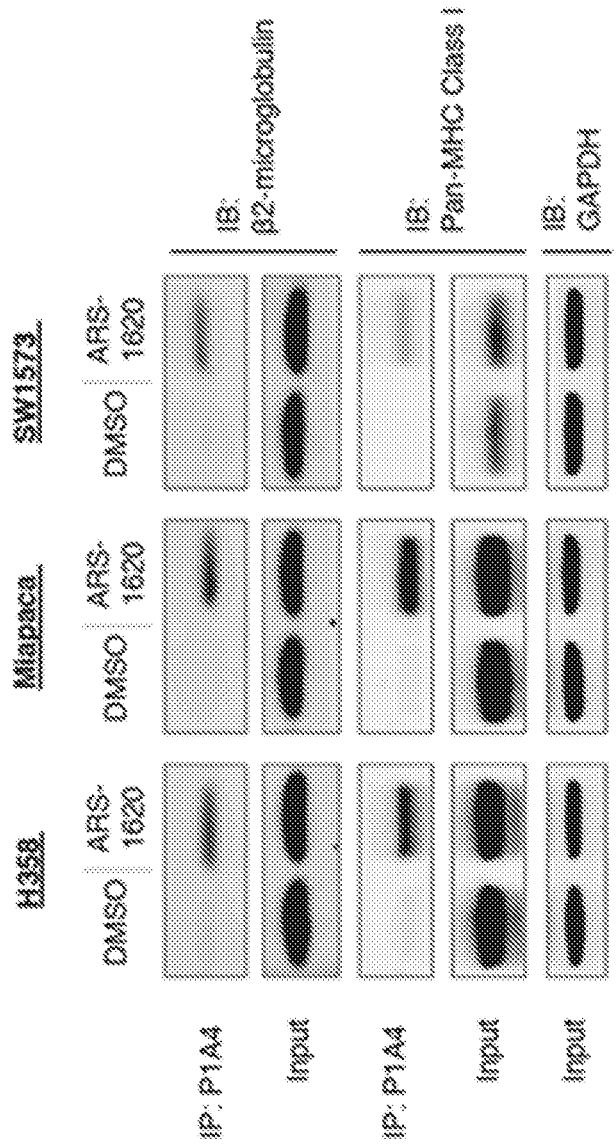
FIG. 6A shows that immunoprecipitation of ARS-1620 with P1A4 pulls down beta2-microglobulin and heavy chains of MHC class I molecules (HLA-A/B/C=pan-MHC class I) from lysates of three KRas G12C cell lines.
Figure 6B:
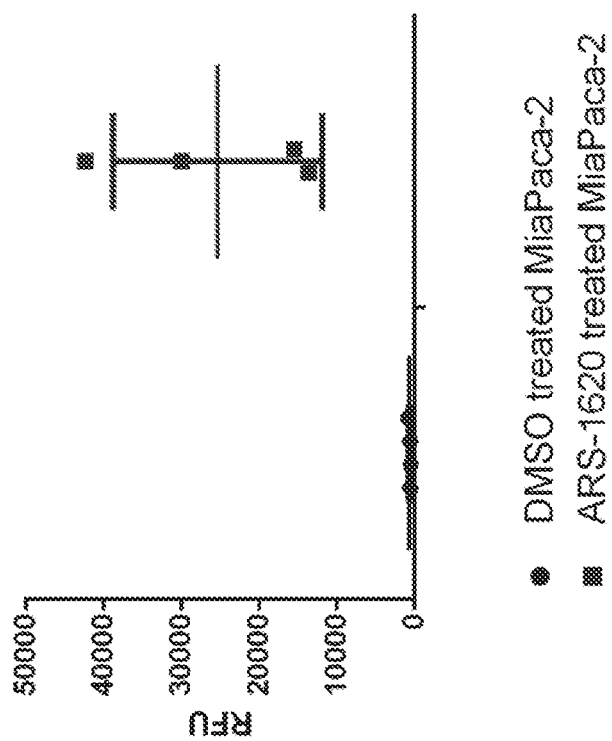
FIG. 6B shows that ARS-1620-labeled peptides are present in MHC eluted peptides by covalent capture ELISA. In brief, MHC bound peptides were isolated from living cells using a standard mild acid elution protocol, and covalently captured via their N-terminus and stained with P1A4 IgG to detect for ARS-1620. No background staining was observed for DMSO-treated cells.

To test whether the cell surface exposed ARS-1620 was pMHC associated, a proximity ligation assay was used in which fluorescent signal is indicative of colocalization of ARS-1620 and MHC (FIG. 5). Fluorescent signal was detectable in a KRas G12C cell line upon addition of ARS-1620 but not the atropisomer or DMSO indicating that there is colocalization of ARS-1620 with MHC molecules. To test whether this colocalization was due to direct covalent reaction with MHC molecules already on the cell surface or due to traditional loading of intracellular MHCs with covalently modified intracellular peptides, a covalent capture ELISA was used to detect ARS-1620 labeled peptides eluted from cells by mild acid elution. A short acid treatment dissociates peptides from the pMHC on living cells, allowing capture of the presented peptides in the acidic buffer supernatant and subsequent covalent immobilization via their N-terminus for ELISA. ARS-1620 haptenized peptides were readily detected in ARS-1620 treated KRas G12C samples, confirming that ARS-1620 labeled peptides are directly presented by MHC molecules (FIG. 6B). The eluted peptides and peptides obtained from MHC immunoprecipitation are analyzed by mass spectrometry to precisely identify haptenized peptide sequences.

Figure 7A:
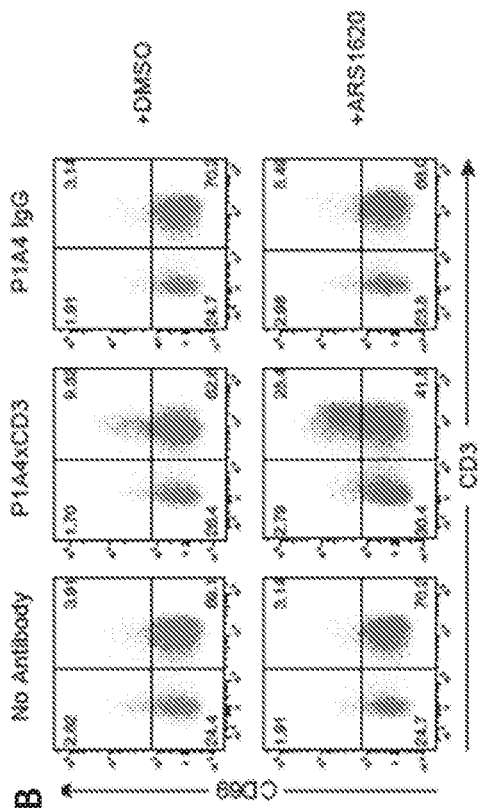
FIG. 7A illustrates the selective killing of ARS-1620-treated KRas G12C (SW1573) cells by peripheral blood mononuclear cells in the presence of a P1A4 BiTE (P1A4×aCD3).
Figure 7B:
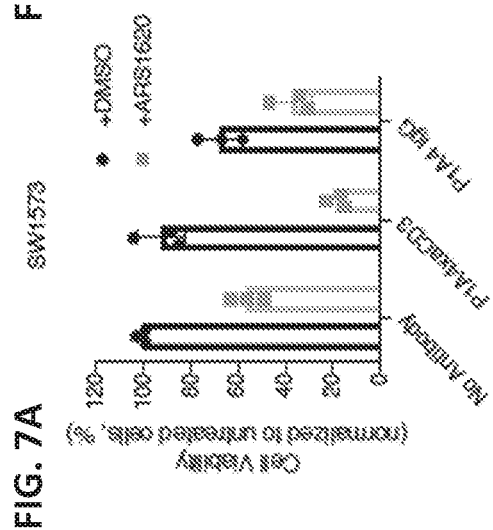
FIG. 7B shows CD3 and CD69 expression on the PBMC of FIG. 7A.
Figure 7C:
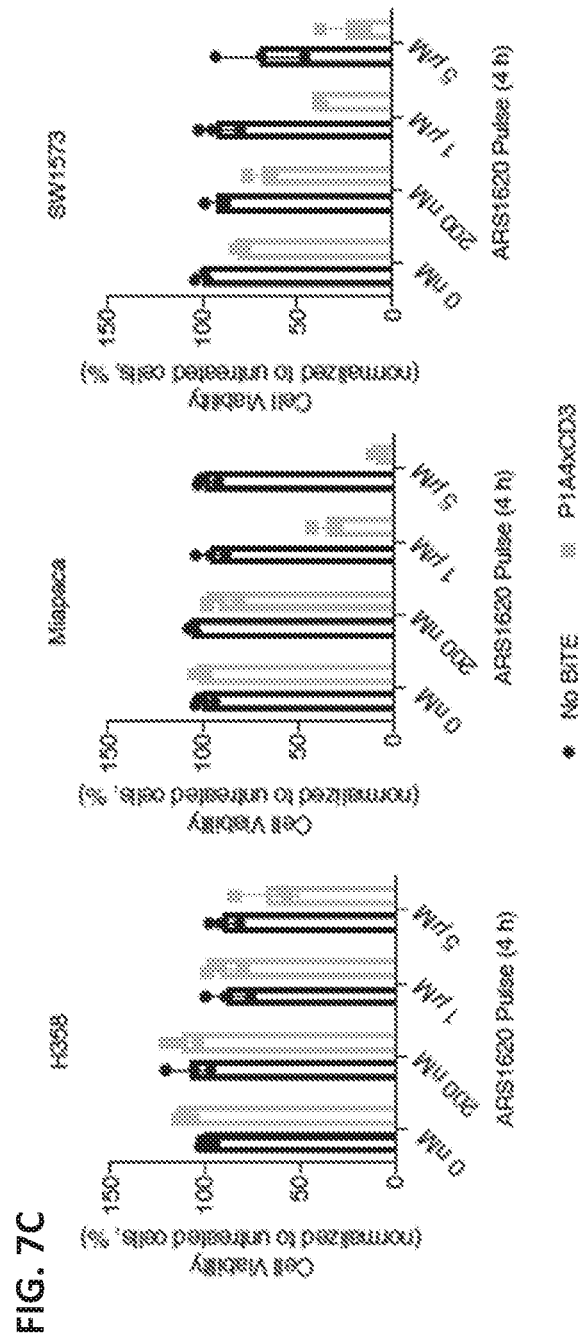
FIG. 7C shows that the P1A4 BiTE (P1A4×CD3) induces ARS-1620-dependent killing of three KRas G12C cell lines in a dose-dependent fashion.
Figure 7D:
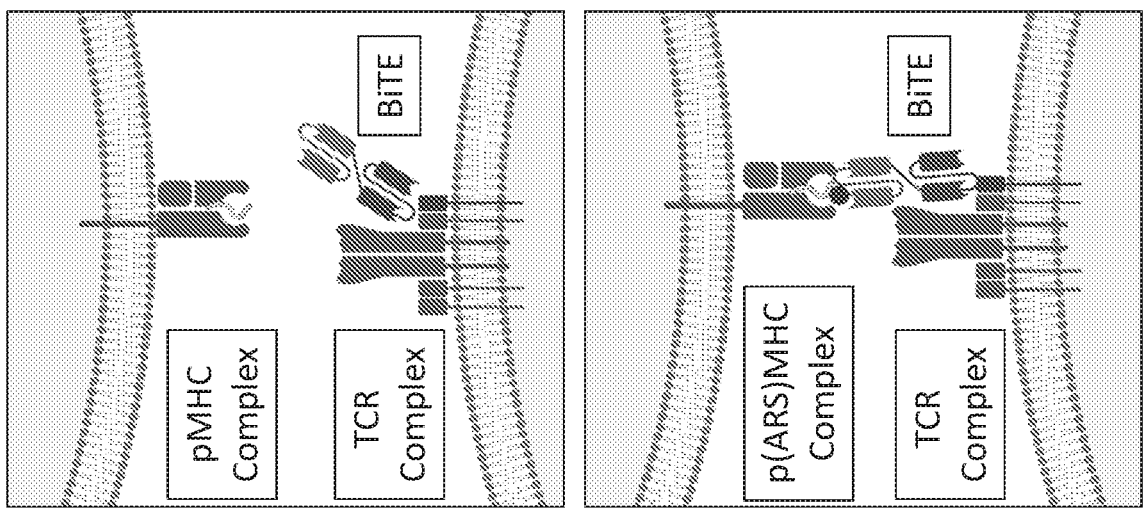
FIG. 7D is a schematic of the neoantigen-specific mechanism of action of BiTE. Only when BiTE and the small molecule (circle) are present does an immunological synapse form. The P1A4 IgG had no significant effect on proliferation, indicating that the cell killing is dependent upon T-cell recruitment.

Subsequently, P1A4 was reformatted as a BiTE (Bispecific T cell Engager) to test whether a cytotoxic T-cell response could be recruited to KRas G12C cells in an ARS-1620 dependent fashion. FIG. 7D illustrates the ARS-1620-specific mechanism of action of the P1A4 BiTE. MiaPaca-2 (KRas G12C) cells were pulsed with either DMSO or ARS-1620 in order to label proteins without exerting a direct pharmacological effect on the health of the cells. Then the cells were co-incubated with peripheral blood mononuclear cells (PBMCs) in the presence of various P1A4 and BiTE constructs, and MiaPaca-2 cell growth was monitored over 72 h. Cell growth was only significantly decreased when ARS-1620 treated cells were co-incubated with a P1A4 BiTE. No strong effect was seen in the absence of ARS-1620 treatment, confirming the response is hapten-dependent. Additionally, ARS-1620 pulse treatment and co-incubation with a P1A4 IgG did not show the same effect as the P1A4 BiTE, further confirming the cell growth retardation was T-cell dependent. Following the 72 hr treatment, cells were stained for T-cell receptors (CD3) and T-cell activation (CD69) and analyzed by flow cytometry. Results are shown in Table 1-5. In brief, ARS-1620 treated cells co-incubated with the P1A4 BiTE showed a 10× increase in the relative proportion of T-cells showing markers for activation as compared to ARS-1620 treated cells in the absence of P1A4 BiTE. Additionally, ARS-1620 treated cells co-incubated with the P1A4 BiTE showed a 6× increase over DMSO treated cells in the presence of P1A4 BiTE. These results confirm that P1A4 BiTE was able to recruit cytotoxic T-cells to pMHCs in a hapten-dependent manner. These analyses were repeated with additional KRas G12C cell lines (H358, SW1573), and the results are shown in FIG. 7A-7C.

TABLE 1-5

| | T Cell Activation | | | |
|---|---|---|---|---|
| | DMSO No Ab | ARS1620 No Ab | DMSO P1A4 × CD3 HL | ARS1620 P1A4 × CD3 HL |
| % CD3 + CD69+ | 2.39 | 2.42 | 4.5 | 28.8 |

Additionally, P1A4 binding to a AMG-510, another KRas G12C covalent inhibitor structurally similar to ARS-1620, was measured by BLI. The P1A4 Fab showed marginal binding ($K_D$>1 μM) to an AMG-510 labeled peptide. In order to test whether ARS-1620 is accessible and targetable on the surface of treated cells in more complex systems, an H358 xenograft murine model was utilized. Mice were xenografted with human H358 (G12C+) cells and treated with either DMSO (placebo), ARS-1620 (1× at 200 mg/kg, or 3× at 200 mg/kg daily), or AMG-510 (1× at 100 mg/kg). Xenografted tumors were harvested following treatment and staining with a P1A4 IgG was measured by flow cytometry to test for cell surface accessible ARS-1620. Overall, little to no P1A4 staining was observed on murine cells (HLA A/B/C-population) and no P1A4 staining was observed upon DMSO or AMG-510 treatment. However, a P1A4+ cell population emerged in both the single dose and the three dose ARS-1620 treatment arms. Evaluation of each tumor sample individually showed that there is variation in the amount of ARS-1620 but that each individual ARS-1620 treated tumor had a P1A4+ population, while none of the DMSO or AMG-510 treated tumors had cell populations with appreciable P1A4 binding. These data confirm that ARS-1620 is accessible for targeting at the cell surface in more advanced animal models of cancer, as well as under cell culture conditions.

In conclusion, antibodies specific to the irreversible KRas G12C inhibitor ARS-1620 have been obtained. ARS-1620 haptenized peptides were demonstrated to be presented and detected in pMHCs at the cell surface and targeting of the ARS-1620 haptenized pMHCs was shown to be sufficient for a hapten-mediated immunotherapy in vitro and in vivo.

We claim:

1. An antibody or antigen binding fragment thereof, comprising:
   (a) a light chain variable region comprising a CDRL1 of SEQ ID NO:33, a CDRL2 of SEQ ID NO:34, CDRL3 of SEQ ID NO:35, and a heavy chain variable region comprising a CDRH1 of SEQ ID NO:36, a CDRH2 of SEQ ID NO:37, and a CDRH3 of SEQ ID NO:38;
   (b) a light chain variable region comprising a CDRL1 of SEQ ID NO:25, a CDRL2 of SEQ ID NO:26, CDRL3 of SEQ ID NO:27, and a heavy chain variable region comprising a CDRH1 of SEQ ID NO:28, a CDRH2 of SEQ ID NO:29, and a CDRH3 of SEQ ID NO:30;
   (c) a light chain variable region comprising a CDRL1 of SEQ ID NO:17, a CDRL2 of SEQ ID NO:18, CDRL3 of SEQ ID NO:19, and a heavy chain variable region comprising a CDRH1 of SEQ ID NO:20, a CDRH2 of SEQ ID NO:21, and a CDRH3 of SEQ ID NO:22;
   (d) a light chain variable region comprising a CDRL1 of SEQ ID NO:41, a CDRL2 of SEQ ID NO:42, CDRL3 of SEQ ID NO:43, and a heavy chain variable region comprising a CDRH1 of SEQ ID NO:44, a CDRH2 of SEQ ID NO:45, and a CDRH3 of SEQ ID NO:46; or
   (e) a light chain variable region comprising a CDRL1 of SEQ ID NO:49, a CDRL2 of SEQ ID NO:50, CDRL3 of SEQ ID NO:51, and a heavy chain variable region comprising a CDRH1 of SEQ ID NO:52, a CDRH2 of SEQ ID NO:53, and a CDRH3 of SEQ ID NO:54, and
   wherein the antibody or antigen binding fragment binds to an antigen comprising the amino acid sequence GAC (1620) GVGKSAL (SEQ ID NO:2) but not the amino acid sequence GACGVGKSAL (SEQ ID NO:1), wherein 1620 is ARS-1620.

2. The antibody or antigen binding fragment of claim 1, wherein the light chain variable region comprises the amino acid sequence of SEQ ID NO:31 and the heavy chain variable region comprises the amino acid sequence of SEQ ID NO: 32.

3. The antibody or antigen binding fragment of claim 1, wherein the light chain variable region comprises the amino acid sequence of SEQ ID NO:23 and the heavy chain variable region comprises the amino acid sequence of SEQ ID NO: 24.

4. The antibody or antigen binding fragment of claim 1, wherein the light chain variable region comprises the amino acid sequence of SEQ ID NO:15 and the heavy chain variable region comprises the amino acid sequence of SEQ ID NO: 16.

5. The antibody or antigen binding fragment of claim 1, wherein the light chain variable region comprises the amino acid sequence of SEQ ID NO:39 and the heavy chain variable region comprises the amino acid sequence of SEQ ID NO: 40.

6. The antibody or antigen binding fragment of claim 1, wherein the light chain variable region comprises the amino acid sequence of SEQ ID NO:47 and the heavy chain variable region comprises the amino acid sequence of SEQ ID NO: 48.

7. The antibody or antigen binding fragment of claim 1, wherein the antibody or antigen binding fragment is selected from the group consisting of a Fab, F(ab')$_2$, Fv and Sfv.

8. The antibody or antigen binding fragment of claim 1, wherein the antibody or antigen binding fragment, is a full-length human immunoglobulin g (IgG) antibody.

9. An immunoconjugate comprising the antibody or antigen binding fragment of claim 1 and a detectable marker or cytotoxic agent.

10. The immunoconjugate of claim 9, wherein the immunoconjugate comprises a detectable marker selected from the group consisting of a radioisotope, a metal chelator, an enzyme, a fluorescent compound, a bioluminescent compound, and a chemiluminescent compound.

11. The immunoconjugate of claim 9, wherein the immunoconjugate comprises a cytotoxic agent selected from the group consisting of an alkylating agent, antimetabolite, mitotic inhibitor, antineoplastic antibiotic, and toxin.

12. An isolated nucleic acid encoding the antibody or antigen binding fragment of claim 1.

13. A method for treating cancer, the method comprising: administering to a patient with cancer an effective amount of the antibody or antigen binding fragment of claim 1, wherein the patient has received or is receiving an effective amount of ARS-1620.

* * * * *